(12) United States Patent
Mandy et al.

(10) Patent No.: US 12,234,844 B2
(45) Date of Patent: Feb. 25, 2025

(54) PNEUMATICS SYSTEM WITH ADVANCED SYSTEM DIAGNOSTICS CAPABILITIES

(71) Applicant: Beckman Coulter, Inc., Brea, CA (US)

(72) Inventors: Christopher Mandy, Orono, MN (US); Robert Torney, Chanhassen, MN (US); Dana Noll, Minnetonka, MN (US); Nicholas Schrag, Chaska, MN (US)

(73) Assignee: Beckman Coulter, Inc., Brea, CA (US)

( * ) Notice: Subject to any disclaimer, the term of this patent is extended or adjusted under 35 U.S.C. 154(b) by 604 days.

(21) Appl. No.: 17/358,356

(22) Filed: Jun. 25, 2021

(65) Prior Publication Data

US 2021/0396250 A1 Dec. 23, 2021

Related U.S. Application Data

(63) Continuation of application No. PCT/US2019/068583, filed on Dec. 26, 2019.

(Continued)

(51) Int. Cl.
*F15B 19/00* (2006.01)
*G01M 3/28* (2006.01)
*H04L 67/12* (2022.01)

(52) U.S. Cl.
CPC ......... *F15B 19/005* (2013.01); *G01M 3/2815* (2013.01); *H04L 67/12* (2013.01)

(58) Field of Classification Search
CPC .............. F15B 19/005; F15B 2211/212; F15B 2211/50554; F15B 2211/6309;

(Continued)

(56) References Cited

U.S. PATENT DOCUMENTS

| 7,555,672 B2 | 6/2009 | Berman et al. |
| 7,661,013 B2 | 2/2010 | Berman et al. |

(Continued)

FOREIGN PATENT DOCUMENTS

| EP | 2843281 A1 | 3/2015 |
| KR | 10-1470455 B1 | 12/2014 |

(Continued)

OTHER PUBLICATIONS

International Search Report and Written Opinion dated Apr. 24, 2020 for Application No. PCT/US2019/068583, 12 pgs.

(Continued)

*Primary Examiner* — Eyob Hagos
(74) *Attorney, Agent, or Firm* — FROST BROWN TODD LLP

(57) ABSTRACT

The present disclosure relates to diagnosing and locating fluid leakage within a pneumatic system (5) using a minimal amount of pressure sensors (55, 75, 89). In general, each branch (51, 71, 85) of a pneumatic system (5) includes an associated pressure sensor (55, 75, 89) and in accordance with how the pneumatic components (57, 59, 61, 77, 91, 93, 95) associated with the pneumatic branch (51, 71, 85) are toggled and monitored, leaks can be detected and located within the branch (51, 71, 85) using a minimal amount of pressure sensors (55, 75, 89). More specifically, pressure and pressure decay may be measured by the sensors (55, 75, 89) within a branch (51, 71, 85) while the pneumatic components (57, 59, 61, 77, 91, 93, 95) are in a particular configuration. The configuration is thereafter changed, and pressure and pressure decay are again measured by the sensors (55, 75, 89). The results of these two measurements may enable the pneumatic system (5) to derive the presence and location of a leak.

14 Claims, 15 Drawing Sheets

Related U.S. Application Data

(60) Provisional application No. 62/785,850, filed on Dec. 28, 2018.

(58) Field of Classification Search
CPC ........ F15B 2211/7142; F15B 2211/855; F15B 2211/857; F15B 2211/8636; F15B 2211/8855; G01M 3/2815; H04L 67/12; H04Q 9/00; H04Q 2209/823; H04Q 2209/86

See application file for complete search history.

(56) References Cited

U.S. PATENT DOCUMENTS

| | | | |
|---|---|---|---|
| 2004/0216514 A1 | 11/2004 | Nunnally et al. | |
| 2005/0234660 A1* | 10/2005 | Kambli | F15B 19/005 |
| | | | 702/51 |
| 2008/0065355 A1 | 3/2008 | Bredau et al. | |
| 2008/0168826 A1 | 7/2008 | Saidi et al. | |
| 2018/0180509 A1 | 6/2018 | Sawachi et al. | |
| 2020/0056634 A1* | 2/2020 | Bell | F16K 15/044 |

FOREIGN PATENT DOCUMENTS

| | | | | |
|---|---|---|---|---|
| KR | 10-1513543 B1 | 4/2015 | | |
| WO | WO 2007/087136 A2 | 8/2007 | | |
| WO | WO-2008100256 A1 * | 8/2008 | ............ | G01F 11/021 |
| WO | WO 2012/165158 A1 | 12/2012 | | |

OTHER PUBLICATIONS

EP 19 90 4763 European Supplementary Search Report dated Sep. 26, 2022, 12 pages.

* cited by examiner

PNEUMATICS SYSTEM WITH ADVANCED SYSTEM DIAGNOSTICS CAPABILITIES

RELATED APPLICATIONS

This application is a continuation of International Application Number PCT/US19/68583, titled "Pneumatics System with Advanced System Diagnostics Capabilities," filed in the United States Patent Office on Dec. 26, 2019, which is related to, and claims the benefit of, provisional patent application No. 62/785,850, titled "Pneumatics System with Advanced System Diagnostics Capabilities" filed in the United States Patent Office on Dec. 28, 2018. Those applications are hereby incorporated by reference in their entirety.

BACKGROUND

Pneumatic system leaks or leakage faults are historically difficult to diagnose and fix in the field. In many cases leaks go undetected by the field service engineers and while a leak may not cause errors on the primary subsystem, it can cause secondary issues on related subsystems, making diagnosis even more difficult. Proper diagnosis requires extensive skill by a field service engineer and detailed knowledge of the pneumatic system to pinpoint leaks. Trial and error are methods are used through sub-branch isolation which is time consuming and does not always yield proper results.

Thus, a need exists for a method or system that enables a pneumatic system to self-diagnose and pinpoint the area where the leak is located within the pneumatic system.

SUMMARY

The disclosure relates to methods of diagnosing a leakage fault in a pneumatic system. In one exemplary method, a plurality of components served by a common branch of the pneumatic system are set to a first configuration with a plurality of corresponding valves. Leakage is thereafter collectively measured from the plurality of components in the first configuration. The plurality of components are then set to a second configuration with the plurality of corresponding valves and leakage is collectively measured from the plurality of components in the second configuration. If the leakage measured with the plurality of components in the first configuration is less than a first configuration threshold value and the leakage measured with the plurality of components in the second configuration is less than a second configuration threshold value, then the method reports a pass result.

In another exemplary method, a first channel is pressurized. In this example, the first channel extends from a manifold through a valve to a first fitting. Thereafter, a first pressure decay within the first channel is measured, wherein the first pressure decay is based at least in part on a change in pressure within the first channel over a first period of time. Thereafter, a second channel is pressurized. In this example, the second channel extends from the manifold through the valve to a second fitting. Thereafter, a second pressure decay within the second channel is measured, wherein the second pressure decay is based at least in part on a change in pressure within the second channel over a second period of time. After the two pressure decays are measured, the first pressure decay and the second pressure decay are compared to a limit threshold. In response to determining the first pressure decay and the second pressure decay are greater than the limit threshold, the method determines the leak exists between the manifold and the valve. In response to determining the first pressure decay is greater than the limit threshold and the second pressure decay is less than the limit threshold, the method determines the leak exists between the valve and the first fitting. In response to determining the first pressure decay is less than the limit threshold and the second pressure decay is greater than the limit threshold, the method determines the leak exists between the valve and the second fitting.

In another exemplary method, a sensor is pneumatically associated with a branch of the pneumatic system. In this example, the branch includes at least two three-way four-port valves, is pneumatically associated with a pneumatic component, and each pneumatic component is pneumatically actuatable to transition between a first state and a second state. Thereafter, each pneumatic component in the branch is pneumatically actuated to pressurize a plurality of channels within the branch. In response to pressurizing a channel in the plurality of channels, the pressure in the channel is measured with the sensor over a period to determine a pressure decay. Thereafter, a location of a leak within the branch is determined, wherein the determination is based at least in part on the measured pressure decays.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1A:
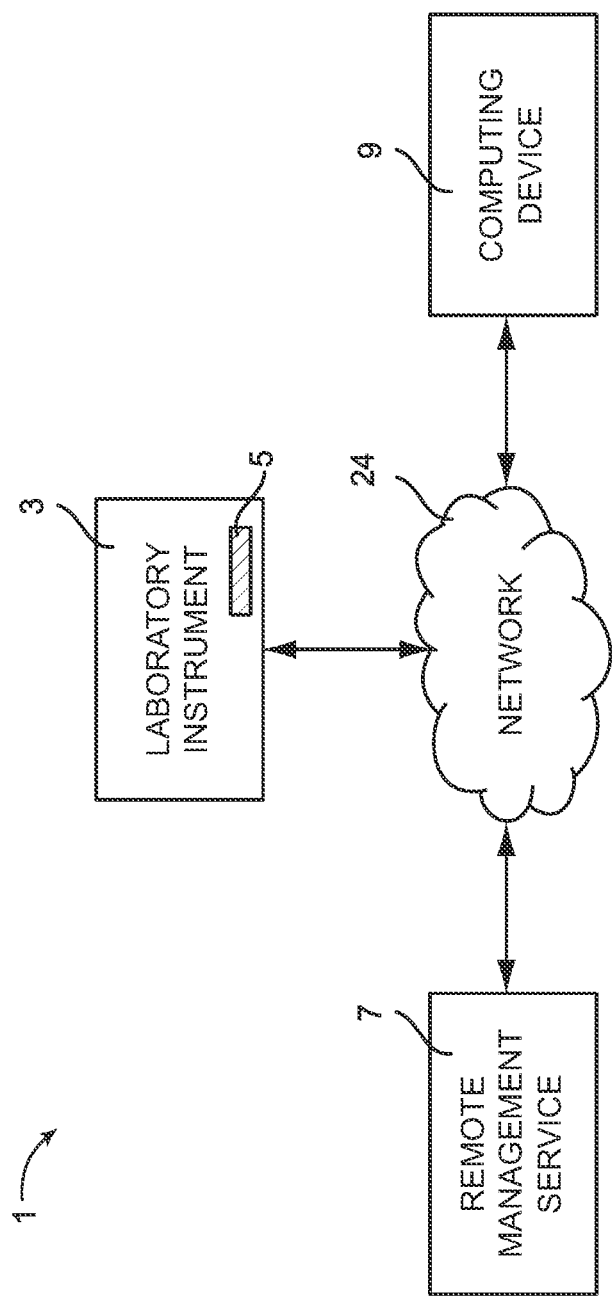
FIG. 1A depicts a schematic view of an exemplary operating environment of an exemplary laboratory instrument.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Operating Environment

Figure 1B:
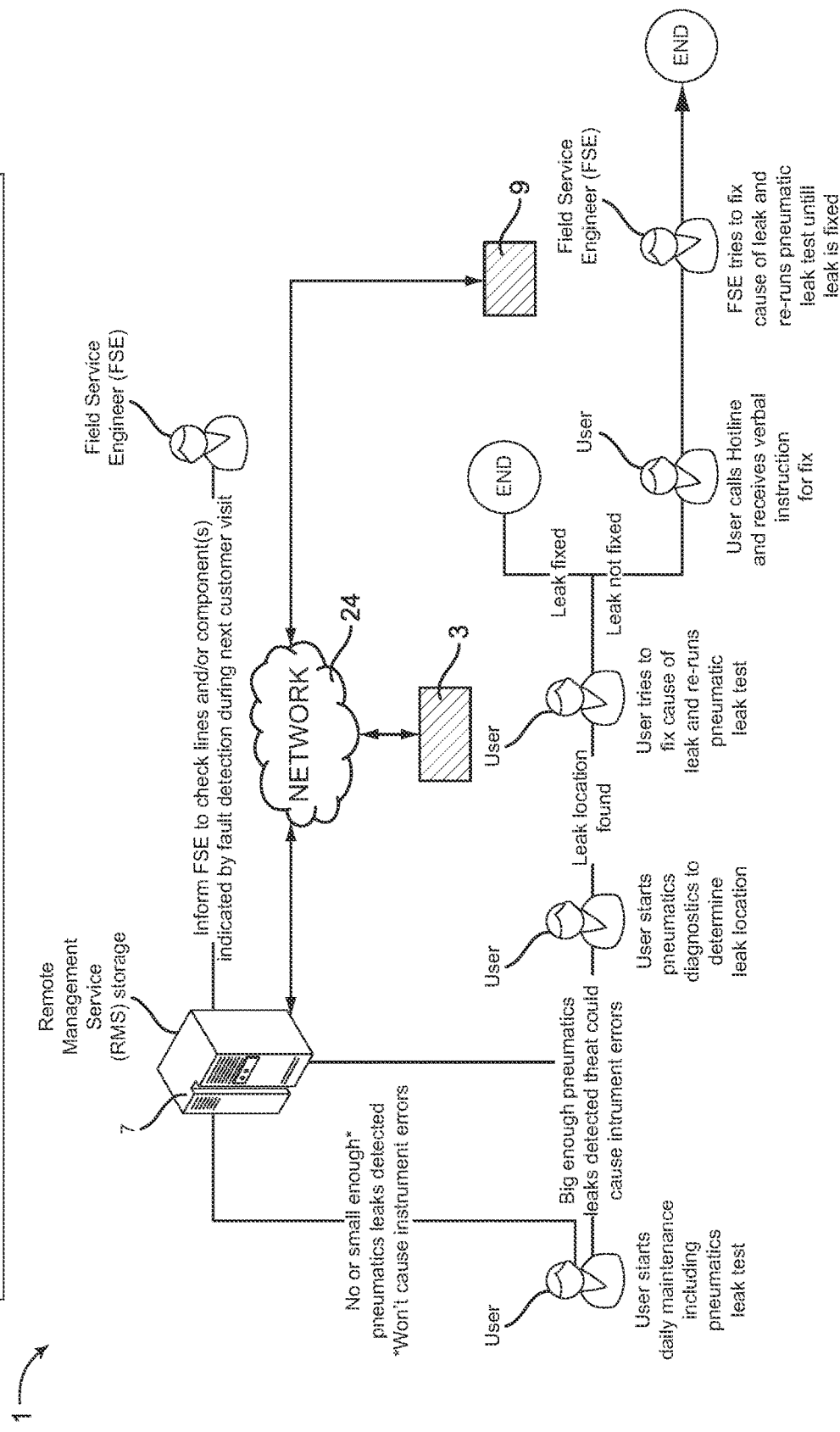
FIG. 1B depicts another schematic view of the exemplary operating environment of an exemplary laboratory instrument.

Referring now to FIGS. 1A and 1B, an operating environment (1) in accordance with some versions of the invention may include a laboratory instrument (3). Laboratory instrument (3) may comprise an analyzer for conducting testing on biological samples or any other type of laboratory testing equipment or instrument. Laboratory instrument (3) may include a pneumatic system with advanced system diagnostics capabilities (5) for use in actuating or facilitating various elements within laboratory instrument (3), hereinafter pneumatics system (5). Pneumatic system (5) may include various valves, channels, and fittings for facilitating pneumatic actuation of the various elements within laboratory instrument (3). Pneumatic leakage, leakage faults, or decay may be monitored and reported through various diagnostics and maintenance mechanisms associated with pneumatic system (5), which will be discussed in greater detail below.

In accordance with some versions of the invention, operating environment (1) may include a remote management service (7). Remote management service (7) may initiate or facilitate the remote diagnostics and maintenance mechanisms within pneumatic system (5) and may alert a field service engineer (FSE) regarding an issue with laboratory instrument (3). Some versions of remote management service (7) may receive and store information regarding a maintenance or diagnostic test of laboratory instrument (3) and apply logic or other data analytics to the data to derive fault detection or maintenance information for use by a field service engineer.

In accordance with some versions of the invention, operating environment (1) may include a computing device (9). A field service engineer or user may utilize computing device (9) for viewing data or actuating components associated with laboratory instrument (3) and/or remote management service (7). For example, computing device (9) may comprise a handheld tablet for providing the field service engineer with diagnostics data collected by remote management service (7) regarding laboratory instrument (3).

In some versions of operating environment (1), laboratory instrument (3), remote management service (7), and computing device (9) may send and receive communications between one another directly. Alternatively, in other versions of operating environment (1), laboratory instrument (3), remote management service (7), and computing device (9) may communicate with each other through a network (24). Network (24) may include one or more private or public networks (e.g. the Internet) that enable the exchange of data.

FIG. 1B depicts an exemplary schematic of operating environment (1) and the diagnostic relationship between remote management service (7), a user of laboratory instrument (3), and a field service engineer. In some versions of operating environment (1), a user may periodically perform maintenance on laboratory instrument (3), which may include actuating or otherwise running a general pneumatics leak test on pneumatics system (5) of laboratory instrument (3). This may be actuated by manually pressing an interface or other mechanism on laboratory instrument (3). In response to this periodic general pneumatics leak test, data is collected regarding the overall performance and stability of pneumatic system (5). Remote management service (7) may thereafter be updated with the test data from the general pneumatics leak test.

If no significant leaks are detected by this general pneumatics leak test, remote management service (7) may update the historical data stored therein with reference to the particular laboratory instrument (3). If a significant enough leak is detected, namely, those that could cause errors in laboratory instrument (3), the user is notified and thereafter may begin a diagnostic pneumatics leak test. In the diagnostic pneumatics leak test, the location of the leak is determined by testing each branch of pneumatics system (5). Once the leak location is identified, the user may attempt to fix the cause of the leak. For example, a tubing element or fitting may be replaced by the user. Thereafter, the general pneumatics leak test is run by the user to determine if the user has fixed the leak. If the user has not fixed the leak, the user can call a hotline or otherwise receive verbal/video instructions from a field service engineer or a technician with instructions on how to fix the leak. Thereafter, the general pneumatics leak test is run by the user to determine if the user has fixed the leak. If the user has not fixed the leak, a field service engineer may be dispatched to fix the cause of the leak by working on pneumatics system (5) and re-running the general pneumatics leak test until the leak is fixed.

In some versions of operating environment (1), a field service engineer may be informed of any relevant metrics, data, historical trends, or test results by laboratory instrument (3), remote management service (7), and/or computing device (9). This may be in the form of an alert or email or some signifier to the field service engineer that the particular laboratory instrument (3) may need attention, either immediately or during the next scheduled on-site visit to laboratory instrument (3). For example, if a diagnostic test of pneumatic system (5) reveals a small leakage in a particular pneumatic branch, an alert or notification may be provided to the field service engineer to check the pneumatic branch during the next site visit to the particular laboratory instrument (3).

Figure 2:
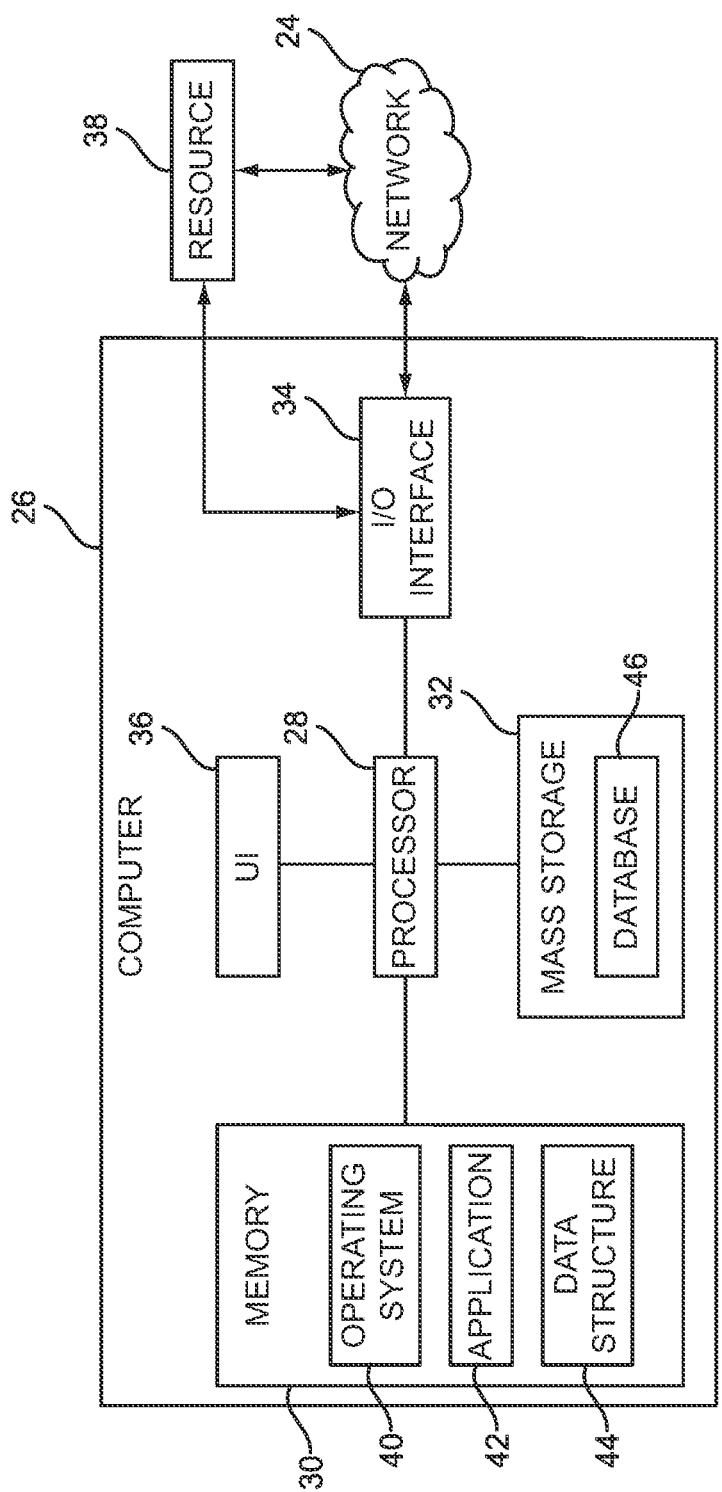
FIG. 2 depicts a schematic view of an exemplary computer system used in the operating environment of FIG. 1A.

Referring now to FIG. 2, laboratory instrument (3), remote management service (7), and computing device (9), and network (24) of operating environment (1) may incorporate or be implemented on one or more computing devices or systems, such as an exemplary computer system (26). Computer system (26) may include a processor (28), a memory (30), a mass storage memory device (32), an input/output (I/O) interface (34), and a User Interface (UI) (36), which may comprise a graphical user interface in some versions of laboratory instrument (3). Computer system (26) may also be operatively coupled to one or more external resources (38) via network (24) or I/O interface (34). External resources may include, but are not limited to, servers, databases, mass storage devices, peripheral devices, cloud-based network services, or any other suitable computer resource that may be used by computer system (26).

Processor (28) may include one or more devices selected from microprocessors, micro-controllers, digital signal processors, microcomputers, central processing units, field programmable gate arrays, programmable logic devices, complex programmable logic devices, logic circuits, analog circuits, digital circuits, or any other devices that manipulate signals (analog or digital) based on device firmware or operational instructions that are stored in memory (30). Memory (30) may include a single memory device or a plurality of memory devices or any other device capable of storing information. Mass storage memory device (32) may include data storage devices such as a hard drive, optical drive, tape drive, non-volatile solid state device, or any other device capable of storing information.

Processor (28) may operate under the control of an operating system (40) that resides in memory (30). Operating system (40) may manage computer resources so that computer program code embodied as one or more computer software applications, such as an application (42) residing in memory (30), may have instructions executed by processor (28). In an alternative embodiment, processor (28) may execute the application (42) directly, in which case operating system (40) may be omitted. One or more data structures (44) may also reside in memory (30), and may be used by processor (28), operating system (40), or application (42) to store or manipulate data.

I/O interface (34) may provide a machine interface that operatively couples processor (28) to other devices and systems, such as network (24) or external resource (38). Application (42) may thereby work cooperatively with network (24) or external resource (38) by communicating via I/O interface (34) to provide the various features, functions, applications, processes, or modules comprising embodiments of the invention. Application (42) may also have program code that is executed by one or more external resources (38), or otherwise rely on functions or signals provided by other system or network components external to computer system (26). Indeed, given the nearly endless hardware and software configurations possible, persons having ordinary skill in the art will understand that embodiments of the invention may include applications that are located externally to computer system (26), distributed among multiple computers or other external resources (38), or provided by computing resources (hardware and software) that are provided as a service over network (24), such as a cloud computing service.

UI (36) may be operatively coupled to processor (28) of computer system (26) in a known manner to allow a user to interact directly with computer system (26). UI (36) may include video or alphanumeric displays, a touch screen, a speaker, and any other suitable audio and visual indicators capable of providing data to the user. UI (36) may also include input devices and controls such as an alphanumeric keyboard, a pointing device, keypads, pushbuttons, control knobs, microphones, etc., capable of accepting commands or input from the user and transmitting the entered input to processor (28).

A database (46) may reside on mass storage memory device (32) and may be used to collect and organize data used by the various systems and modules described herein. Database (46) may include data and supporting data structures that store and organize the data. In particular, database (46) may be arranged with any database organization or structure including, but not limited to, a relational database, a hierarchical database, a network database, or combinations thereof. A database management system in the form of a computer software application executing as instructions on processor (28) may be used to access the information or data stored in records of database (46) in response to a query, where a query may be dynamically determined and executed by operating system (40), other applications (42), or one or more modules.

II. Pneumatic System

Figure 3:
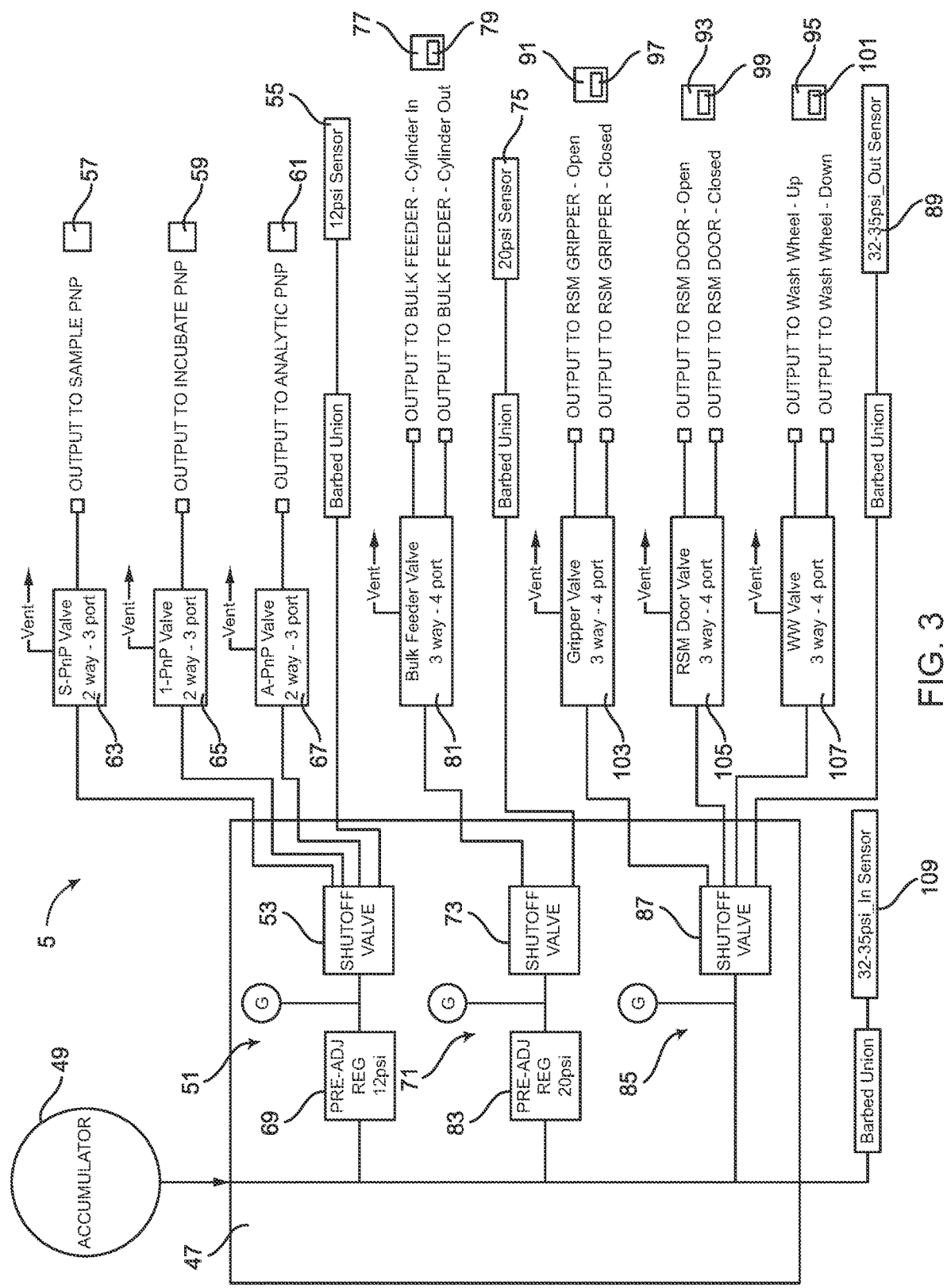
FIG. 3 depicts a schematic view of an exemplary pneumatic system of the laboratory instrument of FIG. 1A.

An exemplary pneumatic system (5) is depicted in FIG. 3 and includes three branches or lines extending from a manifold (47) configured to receive pneumatic fluid (e.g. air or liquid) from an accumulator (49). Each line is exemplary and illustrative of different configurations of pneumatic branches with multiple sub-branches and pneumatic elements associated with a single pressure sensor for detecting leakage and identifying the particular sub-branch location of the leak. The advanced system diagnostics capabilities of pneumatic system (5) leverage, among other features, the single sensor per pneumatic branch to enable leakage detection, isolation, and information regarding the pressure decay or leakage. Components of pneumatic system (5) may be toggled and monitored to detect leaks in the system, isolate the leak, and determine the overall leakage rate or decay, and thereafter provide this data to a field service engineer, user, or other monitoring system.

A first branch of pneumatic system (5), referred to hereinafter as a blue line (51) is associated with a blue line shutoff valve (53) and a blue line sensor (55) configured to determine the pressure within blue line (51). In some versions of pneumatic system (5), blue line (51) is associated with three pneumatic elements embodied by "pick and place" (PnP) actuators. Specifically, in the example shown in FIG. 3, blue line (51) is associated with a sample PnP actuator (57), an incubate PnP actuator (59); and an analytic PnP actuator (61).

Figure 4:
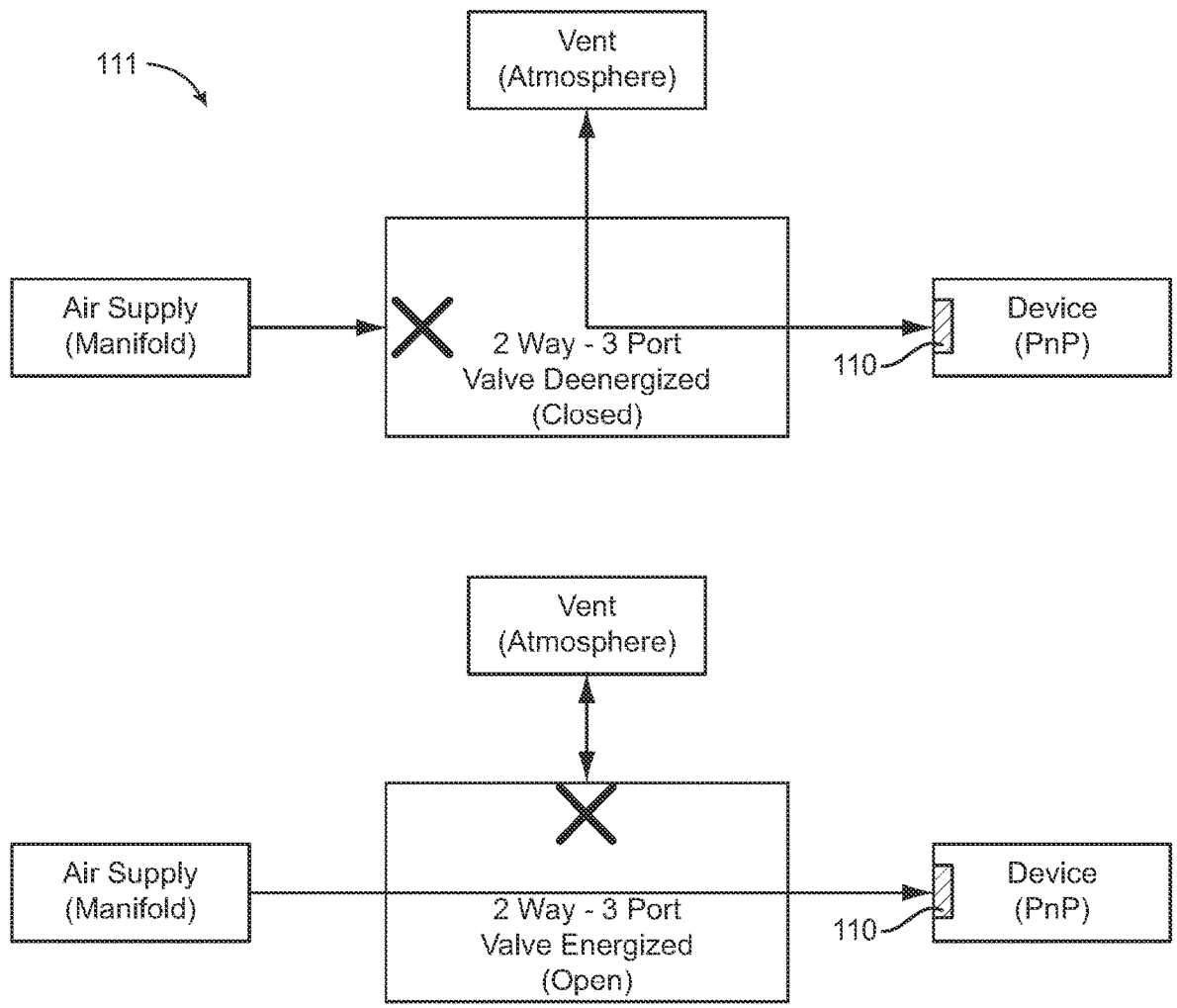
FIG. 4 depicts a schematic view of an exemplary two-way three-port valve used in the pneumatic system of FIG. 3.

Disposed intermediate each PnP actuator (57, 59, 61) and shutoff valve (53) is a corresponding two-way, three-port valve configured to pass fluid to the associated PnP actuator (57, 59, 61) when in a first position and configured to vent fluid to the atmosphere when in a second position. An example schematic of two-way, three-port valve is depicted in FIG. 4.

Specifically, disposed intermediate blue line shutoff valve (53) and sample PnP actuator (57) is a sample pick and place (S-PnP) valve (63). S-PnP valve (63) is configured to pass fluid therethrough to sample PnP actuator (57) when S-PnP valve (63) is in a first position and prevent fluid from passing therethrough to sample PnP actuator (57) when S-PnP valve (63) is in a second position. Fluid between S-PnP valve (63)

and sample PnP actuator (57) is free to vent to the atmosphere when S-PnP valve (63) is in a second position.

Similarly, disposed intermediate blue line shutoff valve (53) and incubate PnP actuator (59) is an incubate pick and place (I-PnP) valve (65). I-PnP valve (65) is configured to pass fluid therethrough to incubate PnP actuator (59) when I-PnP valve (65) is in a first position and prevent fluid from passing therethrough to incubate PnP actuator (59) when I-PnP valve (65) is in a second position. Fluid between I-PnP valve (65) and incubate PnP actuator (59) is free to vent to the atmosphere when I-PnP valve (65) is in the second position.

Disposed intermediate blue line shutoff valve (53) and analytic PnP actuator (61) is an analytic pick and place (A-PnP) valve (67). A-PnP valve (67) is configured to pass fluid therethrough to analytic PnP actuator (61) when A-PnP valve (67) is in a first position and prevent fluid from passing therethrough to analytic PnP actuator (61) when A-PnP valve (67) is in a second position. Fluid between A-PnP valve (67) and analytic PnP actuator (61) is free to vent to the atmosphere when A-PnP valve (67) is in the second position.

Some versions of blue line (51) use a different pressure from that which is provided by accumulator (49) and therefore a blue line regulator (69) may be provided to change the pressure prior to the fluid entering blue line shutoff valve (53).

A second branch of pneumatic system (5), referred to hereinafter as a green line (71) is associated with a green line shutoff valve (73) and a green line sensor (75) configured to determine the pressure within green line (71). In some versions of pneumatic system (5), green line (71) is associated with a bulk feeder (77) having a cylinder element (79) movable between a cylinder in position and a cylinder out position.

Figure 5:
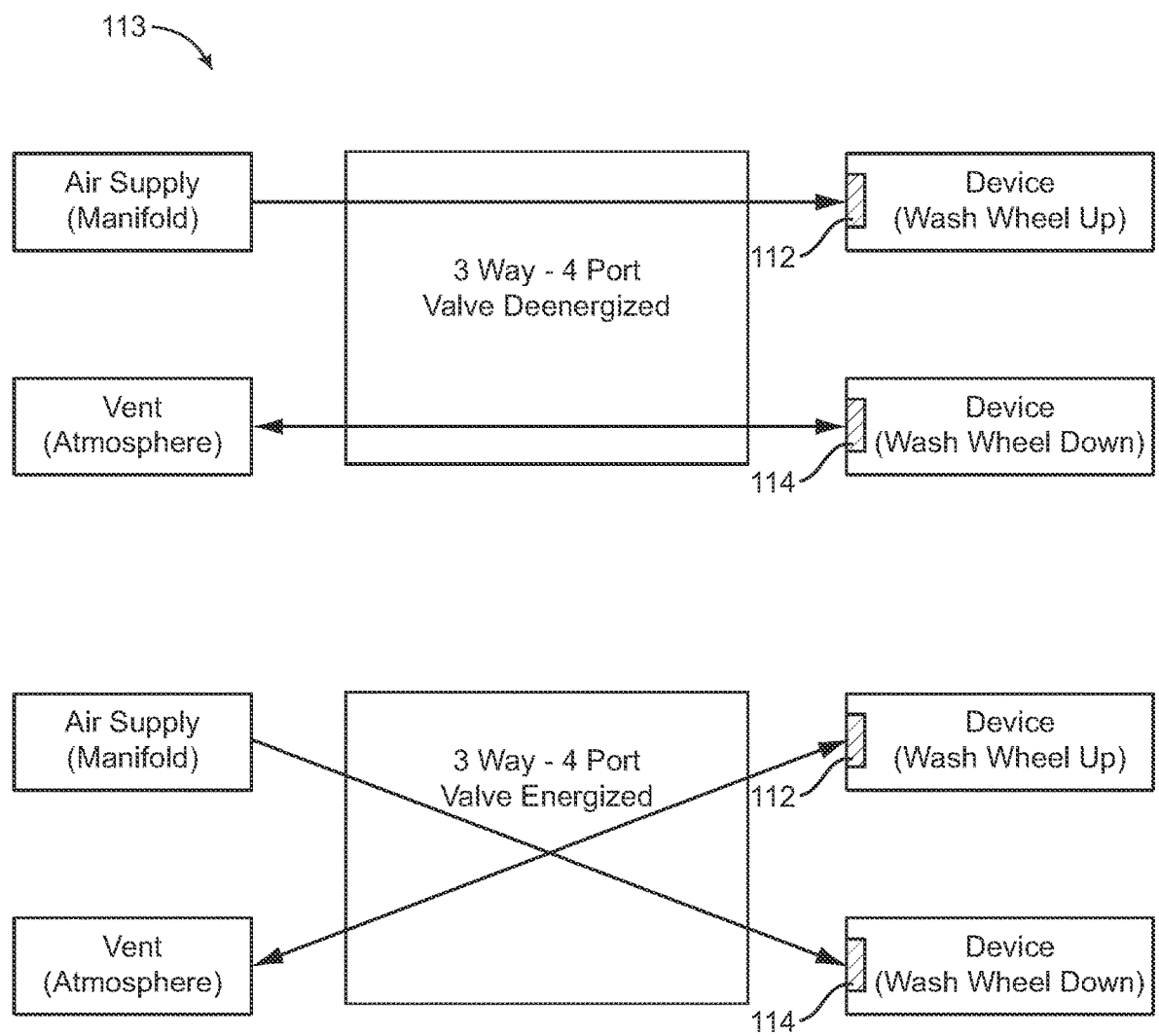
FIG. 5 depicts a schematic view of an exemplary three-way four-port valve used in the pneumatic system of FIG. 3.

Disposed intermediate bulk feeder (77) and green line shutoff valve (73) is a corresponding three-way, four-port valve, referred to hereinafter as bulk feeder valve (81). An example schematic of green line bulk feeder valve (81) is depicted in FIG. 5. Bulk feeder valve (81) may transition between an energized or deenergized state. In the energized state, bulk feeder valve (81) is configured to actuate cylinder element (79) of bulk feeder (77) to the cylinder in position. In the deenergized state, bulk feeder valve (81) is configured to actuate cylinder element (79) of bulk feeder (77) to the cylinder out position. Other versions of green line shutoff valve (73) may be configured to provide the opposite actuations, namely, actuating cylinder element (79) to the cylinder out position in the energized state and actuating cylinder element (79) to the cylinder in position in the deenergized state.

Some versions of green line (71) use a different pressure from that which is provided by accumulator (49) and therefore a green line regulator (83) may be provided to change the pressure prior to the fluid entering green line shutoff valve (73).

A third branch of pneumatic system (5), referred to hereinafter as a yellow line (85) is associated with a yellow line shutoff valve (87) and a yellow line sensor (89) configured to determine the pressure within yellow line (85). In some versions of pneumatic system (5), yellow line (85) is associated with three pneumatic elements generally configured to transition between a first position and a second position.

Specifically, in the example shown in FIG. 3, yellow line (85) is associated with a "reagent storage module" (RSM) gripper (91), a "reagent storage module" (RSM) door (93), and a wash wheel (95), shown as "WW" in some figures. RSM gripper (91) includes a gripper element (97) movable between an open position and a closed position. RSM door (93) includes a door element (99) movable between an open position and a closed position. Wash wheel (95) includes a wash wheel arm element (101) movable between an up position and a down position.

Disposed intermediate RSM gripper (71) and yellow line shutoff valve (87) is a corresponding three-way, four-port valve, referred to hereinafter as gripper valve (103). An example schematic of gripper valve (103) is depicted in FIG. 5. Gripper valve (103) may transition between an energized or deenergized state. In the energized state, gripper valve (103) is configured to actuate gripper element (97) of RSM gripper (91) to the open position. In the deenergized state, gripper valve (103) is configured to actuate gripper element (97) of RSM gripper (91) to the closed position. Gripper valve (103) may be configured to provide the opposite actuations, namely, actuating gripper element (97) to the closed position in the energized state and actuating gripper element (97) to the open position in the deenergized state. Other versions of gripper valve (103) may incorporate a latching valve with one electrical input to open and one input to close; neither of which inputs require continuous energy to maintain position.

Disposed intermediate RSM door (93) and yellow line shutoff valve (87) is a corresponding three-way, four-port valve, referred to hereinafter as door valve (105). An example schematic of door valve (105) is depicted in FIG. 5. Door valve (105) may transition between an energized or deenergized state. In the energized state, door valve (105) is configured to actuate door element (99) of RSM door (93) to the open position. In the deenergized state, door valve (105) is configured to actuate door element (99) of RSM door (93) to the closed position. Door valve (105) may be configured to provide the opposite actuations, namely, actuating door element (99) to the closed position in the energized state and actuating door element (99) to the open position in the deenergized state.

Disposed intermediate wash wheel (95) and yellow line shutoff valve (87) is a corresponding three-way, four-port valve, referred to hereinafter as wheel valve (107). An example schematic of wheel valve (107) is depicted in FIG. 5. Wheel valve (107) may transition between an energized or deenergized state. In the energized state, wheel valve (107) is configured to actuate wash wheel arm element (101) of wash wheel (95) to the up position. In the deenergized state, wheel valve (107) is configured to actuate wash wheel arm element (101) of wash wheel (95) to the down position. Wheel valve (107) may be configured to provide the opposite actuations, namely, actuating wash wheel arm element (101) to the down position in the energized state and actuating wash wheel arm element (101) to the up position in the deenergized state.

Some versions of yellow line (85) use a different pressure from that which is provided by accumulator (49) and therefore a yellow line regulator (not shown) may be provided to change the pressure prior to the fluid entering yellow line shutoff valve (87).

A manifold sensor (109) may be provided to sense the pressure in manifold (47). Manifold sensor (109) is disposed downstream of accumulator (49) and upstream of blue line shutoff valve (53), green line shutoff valve (73), and yellow line shutoff valve (87) to provide information regarding the pressure between accumulator (49) and these elements.

Cylinder element (79), gripper element (97), door element (99), and wash wheel arm element (101) are shown and described for illustrative purposely only. Any pneumatic component may be used in conjunction with or in place of these pneumatic components.

FIG. 4 depicts a schematic of a two-way three-port valve (111) in the deenergized state and closed position as well as in the energized state and the open position. As discussed above, in some versions of pneumatic system (5), S-PnP valve (63), I-PnP valve (65) and/or A-PnP valve (67) may resemble or comprise valve (111). Two-way three-port valve (111) may be configured to pressurize a fitting (110) disposed on one of the pneumatic components connected thereto, namely, sample PnP actuator (57), incubate PnP actuator (59), and/or analytic PnP actuator (61).

FIG. 5 depicts a schematic of a three-way four-port valve (113) in the deenergized state as well as in the energized state. As discussed above, in some versions of pneumatic system (5), bulk feeder valve (81), gripper valve (103), door valve (105), and/or wheel valve (107) may resemble or comprise valve (113). Three-way four-port valve (113) may be configured to pressurize a fitting (112) disposed on one of the pneumatic components connected thereto, namely, bulk feeder (77), RSM gripper (91), RSM door (93), and/or wash wheel (95). Three-way four-port valve (113) may also be configured to pressurize a fitting (114) disposed on one or more of the pneumatic components connected thereto.

Figure 6:
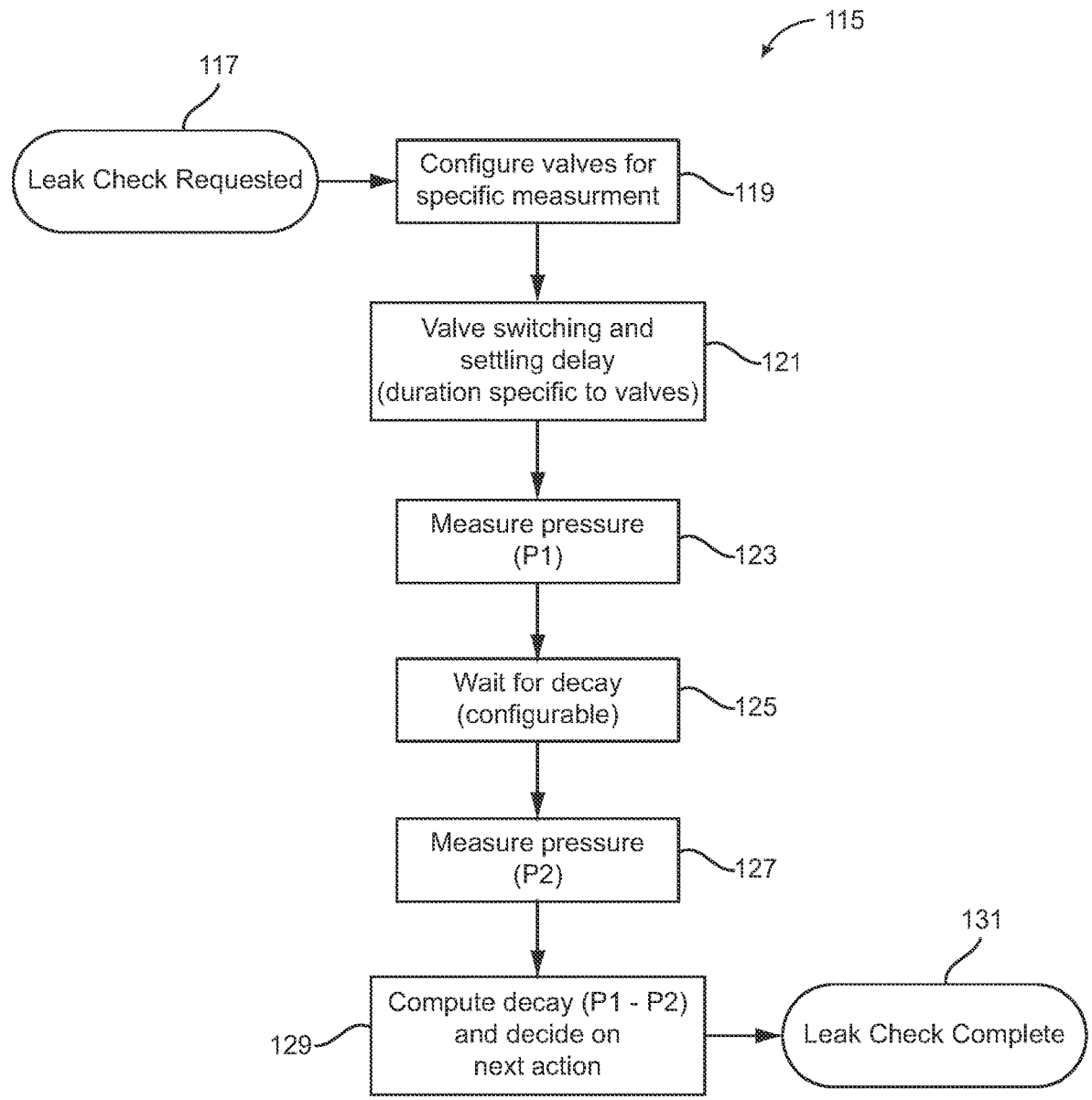
FIG. 6 depicts a flowchart of an exemplary method for checking for a leak in the pneumatic system of FIG. 3.

FIG. 6 depicts a method (115) used within pneumatic system (5) for determining whether a leak exists while also as capturing information regarding the decay of the leak. The terms "leak," "leakage," and "leakage fault" may be used interchangeably through the disclosure to mean an unintentional exhausting of pneumatic fluid from pneumatic system (5).

Method (115) begins with a leak check request step (117). Leak check request step (117) may be initiated by a system of laboratory instrument (3), manually initiated by a user, or initiated by an external source connected to laboratory instrument (3). Once initiated, leak check request step (117) proceeds to a step (119). In step (119), the valve or valves associated with the particular portion of pneumatic system (5) being tested are configured and/or switched to the states (i.e. opening and closing valves, etc.) required for the portion of pneumatic system (5). Thereafter, step (119) proceeds to a step (121).

In step (121), a delay is initiated to allow for the valves in the particular portion of pneumatic system (5) being tested to settle and normalize. After this delay, step (121) proceeds to a step (123). In step (123), the pressure within the particular portion of pneumatic system (5) being tested is sensed and this pressure data is captured and stored. The initial pressure measurement is represented as "P1" in FIG. 6. Sensors such as blue line sensor (55), green line sensor (75), and yellow line sensor (89) may be used, depending on the particular portion of pneumatic system (5) being tested. Once P1 is captured, step (123) proceeds to a step (125). In step (125), a delay is initiated to allow for a time variance between pressure readings. After this delay, step (125) proceeds to a step (127). In step (127), the pressure within the particular portion of pneumatic system (5) being tested is sensed and this pressure data is captured and stored. This subsequent pressure measurement is represented as "P2" in FIG. 6. If a leak is present, the pressure will have decreased in the intervening time between the capture of P1 and P2. After P2 is captured, step (127) proceeds to a step (129).

In step (129), the pressure difference within the particular portion of pneumatic system (5) being tested is computed by subtracting P2 from P1. If there is no difference in the pressure readings, or only a nominal difference, method (115) determines there is not a leak present. If there is a difference between P1 and P2, method (115) determines there is a leak present. Further, the difference between P1 and P2, plotted over the time delay of step (125), provides information regarding the decay of the leak. For example, if P1 equals 10 psi, P2 equals 8 psi, and the time delay between pressure readings was 2 seconds, method (115) determines there is a leak and the leak correlates to a pressure decay of about 1 psi per second.

After step (129), method (115) proceeds to a step (131), where the leak check is complete, and any data requested or provided by method (115) may be passed on to the initiator of method (115) for further use.

III. Diagnostics Testing for Pneumatic System

Oftentimes, it can be derived by a field service engineer or technician or the instrument itself that a leak exists within a pneumatic system, but the particular portion of the pneumatics system that contains a leak is not known. Thus, the entire pneumatics system, such as pneumatics system (5), must be tested to determine the location of the leak. Alternatively, a leak check of pneumatics system (5) may be incorporated into a routine system check to monitor the health of laboratory instrument (3) in general, and pneumatic system (5) in particular.

With reference to FIGS. 1A and 1B, a check of the entire pneumatic system (5) may be actuated by remote management service (7) or computing device (9). For example, a technician may actuate a check of the entire pneumatic system (5) via computing device (9) embodied by a tablet computer on site. Alternatively, laboratory instrument (3) may include a trigger element for allowing a user or technician to manually actuate a check of the entire pneumatic system (5) by pressing a button or a similar interface feature incorporated into laboratory instrument (3).

Figure 7:
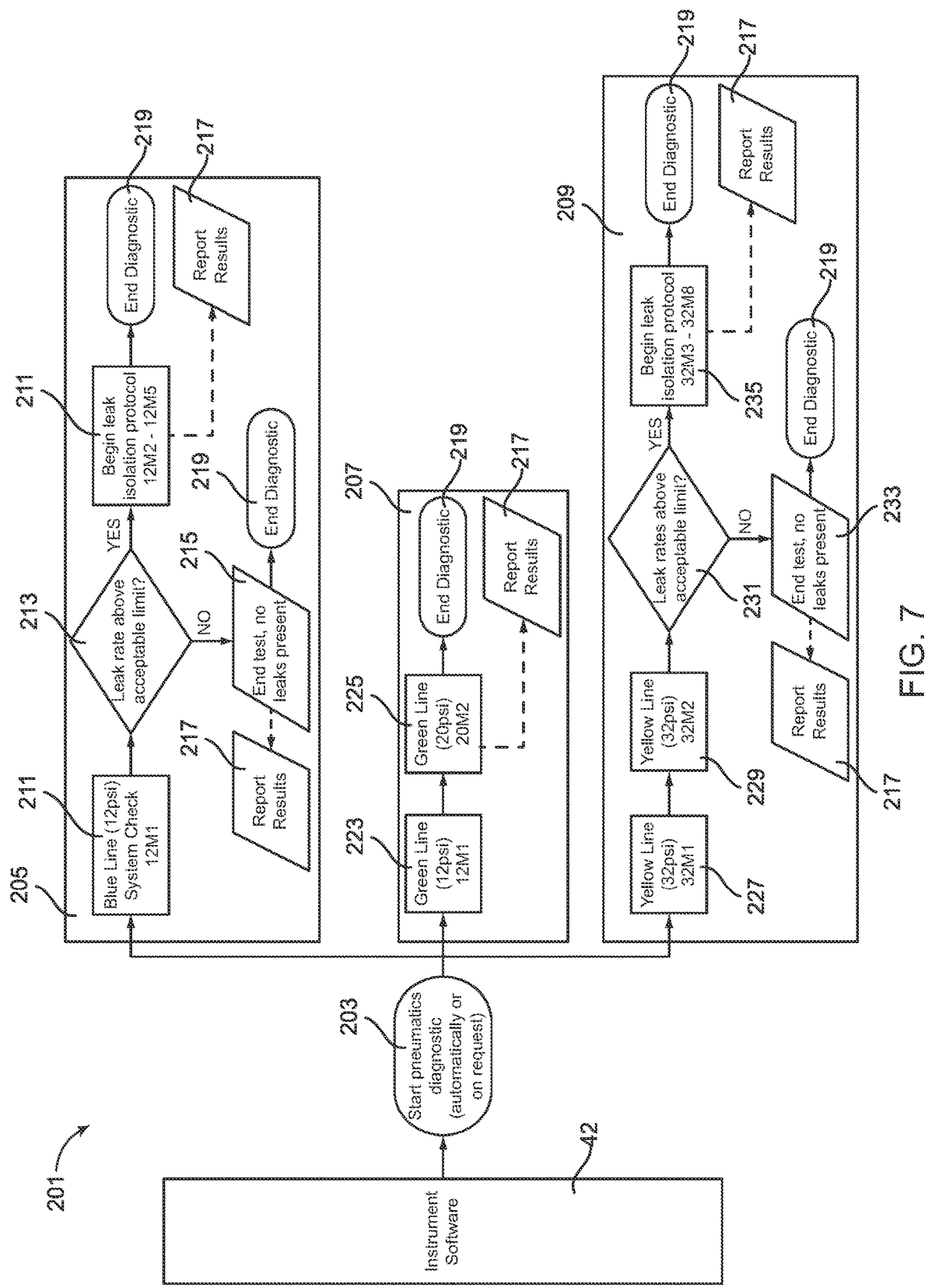
FIG. 7 depicts a flowchart of another exemplary method for checking for a leak in the pneumatic system of FIG. 3.

FIG. 7 depicts a method (201) for performing a diagnostic test on the entirety of pneumatic system (5) to determine whether any leaks exist as well as isolate the leak to a particular subsystem. Method (201) performs a system-wide diagnostics test using a reduced and/or minimal number of sensors compared to conventional pneumatic system diagnostic testing. Conventional systems associate a sensor with every branch of the pneumatics system, which increases costs, complexity, and time required to run the diagnostics test. While method (201) illustrates a diagnostic test on the entirety of pneumatic system (5), other version of method (201) allow for the user to select a particular sub-branch of pneumatic system (5) for running a diagnostic test. For example, a user may desired to run a portion of method (201) to determine whether a leak exists within blue line (51).

Method (201) begins with a step (203) whereby a diagnostics test of pneumatics system (5) is initiated. Step (203) may be initiated by a system of laboratory instrument (3), manually initiated by a user, or initiated by an external source connected to laboratory instrument (3). Once initiated, step (203) proceeds generally simultaneously to a blue line system check step (205), a green line system check step (207), and a yellow line system check step (209) to determine whether a leak exists within any of these three subsystems. In general and as necessary until a leak is identified and isolated, blue line system check step (205), green line system check (207), and yellow line system check (209) each iteratively open and close the valves associated therewith, polling the associated sensor, namely, blue line sensor (55), green line sensor (75), and yellow line sensor (89) to determine if a leak exists in that particular configuration of the underlying valve structure using method (115) as described above. Once identified, the location of the leak and the leak decay is transmitted to the requesting entity, such as a technician, a system of laboratory instrument (3), or an external source connected to laboratory instrument (3).

Blue line system check step (205) will be discussed in greater detail with reference to FIG. 8. However, in general, blue line system check step (205) begins with a step (211). In step (211), blue line (51) is checked with all valves open to determine whether a leak exists anywhere within blue line (51). In some versions of method (201), method (115) is utilized for making this determination. Thereafter, step (211) proceeds to a step (213) whereby it is determined whether there exists a leak anywhere within blue line (51) and if so, the associated leak rate or decay. If a leak having a leak rate below an acceptable limit is determined, step (213) proceeds to a step (215) whereby blue line system check step (205) is terminated without proceeding into individual sub-branches of blue line (51) because no leak was detected. Thereafter, step (215) optionally proceeds to report the results of the associated leak check in a step (217) and simultaneously ends the diagnosis in a step (219). If step (213) determines the measured leak rate within blue line (51) is beyond an acceptable limit, step (213) proceeds to a step (221). In step (221), a leak isolation protocol is initiated, whereby each sub-branch of blue line (51) is tested to determine the location of the leak. Once the leak is located, step (221) optionally proceeds to report the results of the associated leak check in step (217) and simultaneously ends the diagnosis in step (219).

Green line system check step (207) will be discussed in greater detail with reference to FIG. 9. However, in general, green line system check step (207) begins with a step (223). In step (223), cylinder element (79) is moved to the cylinder in position and green line (71) is checked to determine whether a leak exists. In some versions of method (201), method (115) is used for making this determination. Thereafter, step (223) proceeds to a step (225). In step (225), cylinder element (79) is moved to the cylinder out position and green line (71) is checked to determine whether a leak exists. In some versions of method (201), method (115) is used for making this determination. Thereafter, step (225) optionally proceeds to report the results of the associated leak check in step (217) and simultaneously ends the diagnosis in step (219).

Yellow line system check step (209) will be discussed in greater detail with reference to FIGS. 10A-10C. However, in general, yellow line system check step (209) begins with a step (227) whereby yellow line (85) is moved to a default configuration, with gripper valve (103), door valve (105), and wheel valve (107) moved to a particular position corresponding with the default position. Thereafter, yellow line (85) in the default position is checked to determine whether a leak exists. In some versions of method (201), method (115) is used for making this determination. Thereafter, step (227) proceeds to a step (229). In step (229), yellow line (85) is moved to a non-default configuration, with gripper valve (103), door valve (105), and wheel valve (107) moved to a particular position corresponding with the non-default position. Thereafter, yellow line (85) in the non-default position is checked to determine whether a leak exists. In some versions of method (201), method (115) is used for making this determination. Thereafter, step (229) proceeds to a step (231). In step (231), a determination is made regarding whether the leak rates measured in step (227) and (229) are above the acceptable limit. If so, step (331) proceeds to a step (233) whereby yellow line system check step (209) is terminated without proceeding into individual sub-branches of yellow line (85) because no leak was detected. Thereafter, step (233) optionally proceeds to report the results of the associated leak check in step (217) and simultaneously ends the diagnosis in step (219). If step (231) determines the measured leak rate within yellow line (85) is beyond an acceptable limit, step (231) proceeds to a step (235). In step (235), a leak isolation protocol is initiated, whereby each sub-branch of yellow line (85) is tested to determine the location of the leak. Once the leak is located, step (235) optionally proceeds to report the results of the associated leak check in step (217) and simultaneously ends the diagnosis in step (219).

Once blue line system check step (205), green line system check (207), and yellow line system check (209) are complete, the leak decay rate and the location of the leak is isolated down to the particular sub-branch of either blue line (51), green line (71), or yellow line (85) and the leak decay rate is known. A technician or the user/owner of laboratory instrument (3) can then take steps to address the leak. Inasmuch as blue line system check step (205), green line system check (207), and yellow line system check (209) can be run in parallel, method (201) may be completed in a short amount of time, minimizing downtime for laboratory instrument (3) and technician time for a technician.

A. Blue Line System Check

Figure 8:
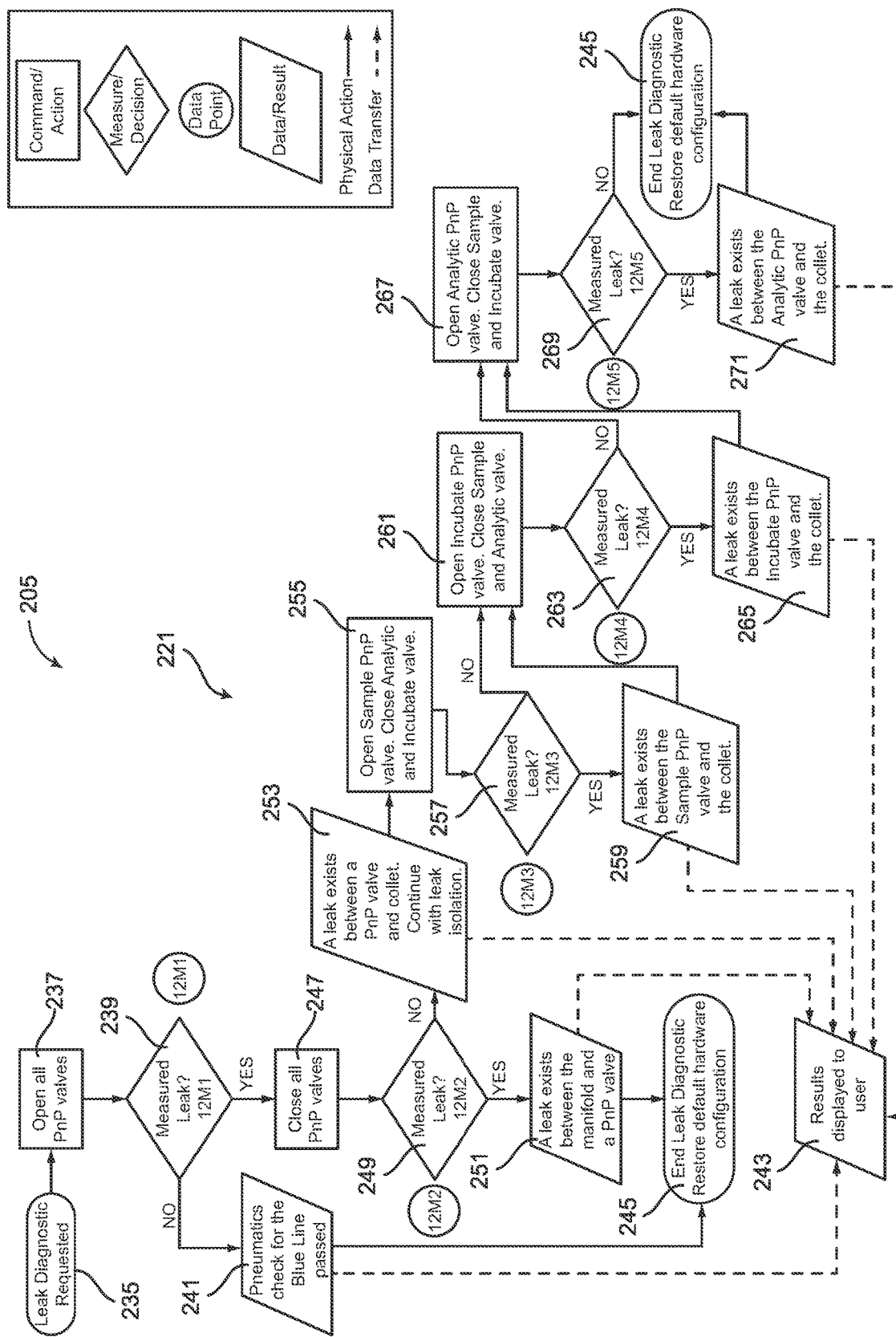
FIG. 8 depicts a flowchart of an exemplary method for checking for a leak in an exemplary first branch of the pneumatic system of FIG. 3.

Blue line system check step (205) is depicted in greater detail in FIG. 8. Blue line system check step (205) begins with a step (235) whereby a leak diagnostic is requested. Thereafter, step (235) proceeds to a step (237). In step (237), all valves within blue line (51) are opened, namely, S-PnP valve (63), I-PnP valve (65), A-PnP valve (67). Thereafter, step (237) proceeds to a step (239), whereby a leak detection method such as method (115) is performed on blue line (51) with all open valves and a determination is made regarding whether a leak is detected in this configuration. If no leak is detected, step (239) proceeds to a step (241) to indicate the pneumatics check for blue line (51) has passed and there is no detected leak in blue line (51). Thereafter, step (241) optionally proceeds to a step (243) to report the results of blue line system check step (205) and simultaneously proceeds to a step (245) to restore the default hardware configuration for blue line (51) and end blue line system check step (205).

If a leak is detected, step (239) proceeds to a step (247). In step (247), all valves within blue line (51) are closed, namely, S-PnP valve (63), I-PnP valve (65), A-PnP valve (67). Thereafter, step (247) proceeds to a step (249), whereby a leak detection method such as method (115) is performed on blue line (51) with all closed valves and a determination is made regarding whether a leak is detected in this configuration. If a leak is detected, step (249) proceeds to a step (251) to indicate a leak exists between manifold (47) and one of the valves of blue line (51). Due to the topology of pneumatics system (5), further isolation of the detected leak is not possible. Thus, step (251) optionally proceeds to step (243) to report the results of blue line system check step (205) and simultaneously proceeds to step (245) to restore the default hardware configuration for blue line (51) and end blue line system check step (205).

If a leak is not detected, step (249) proceeds to a step (253) to indicate a leak exists between a valve in blue line (51) and the particular actuator associated with that valve. More particularly, proceeding to step (253) indicates a leak exists between one or more of S-PnP valve (63) and sample PnP actuator (57), I-PnP valve (65) and incubate PnP actuator (59), or A-PnP valve (67) and analytic PnP actuator (61). Step (253) and those steps subsequent thereto are generally reflected in step (221) of FIG. 7, whereby a leak isolation protocol is conducted to isolate the leak and determine which of the valves are associated with the leak. Step (253) proceeds to a step (255).

In step (255), S-PnP valve (63) is opened, while I-PnP valve (65) and A-PnP valve (67) are closed. Thereafter, step (255) proceeds to a step (257) whereby a leak detection method such as method (115) is performed and a determination is made regarding whether a leak exists between S-PnP valve (63) and sample PnP actuator (57). If a leak is detected, step (257) proceeds to a step (259) to indicate a leak exists between S-PnP valve (63) and sample PnP actuator (57). Thereafter, step (259) optionally proceeds to step (243) to report the results and simultaneously proceeds to a step (261). Similarly, if no leak is detected, step (257) proceeds to step (261).

In step (261), I-PnP valve (65) is opened, while S-PnP valve (63) and A-PnP valve (67) are closed. Thereafter, step (261) proceeds to a step (263) whereby a leak detection method such as method (115) is performed and a determination is made regarding whether a leak exists between I-PnP valve (65) and incubate PnP actuator (59). If a leak is detected, step (263) proceeds to a step (265) to indicate a leak exists between I-PnP valve (65) and incubate PnP actuator (59). Thereafter, step (265) optionally proceeds to step (243) to report the results and simultaneously proceeds to a step (267). Similarly, if no leak is detected, step (263) proceeds to step (267).

In step (267), A-PnP valve (67) is opened, while S-PnP valve (63) and I-PnP valve (65) are closed. Thereafter, step (267) proceeds to a step (269) whereby a leak detection method such as method (115) is performed and a determination is made regarding whether a leak exists between A-PnP valve (67) and analytic PnP actuator (61). If a leak is detected, step (269) proceeds to a step (271) to indicate a leak exists between A-PnP valve (65) and analytic PnP actuator (61). Thereafter, step (271) optionally proceeds to step (243) to report the results and simultaneously proceeds to step (245). Similarly, if no leak is detected, step (269) proceeds to step (245).

Each leak determination and pressure measurement of blue line system check step (205) is performed using blue line sensor (55). Thus, a leak may be detected, located, and the pressure decay determined anywhere within blue line (51) using a single sensor, namely, blue line sensor (55).

B. Green Line System Check

Figure 9:
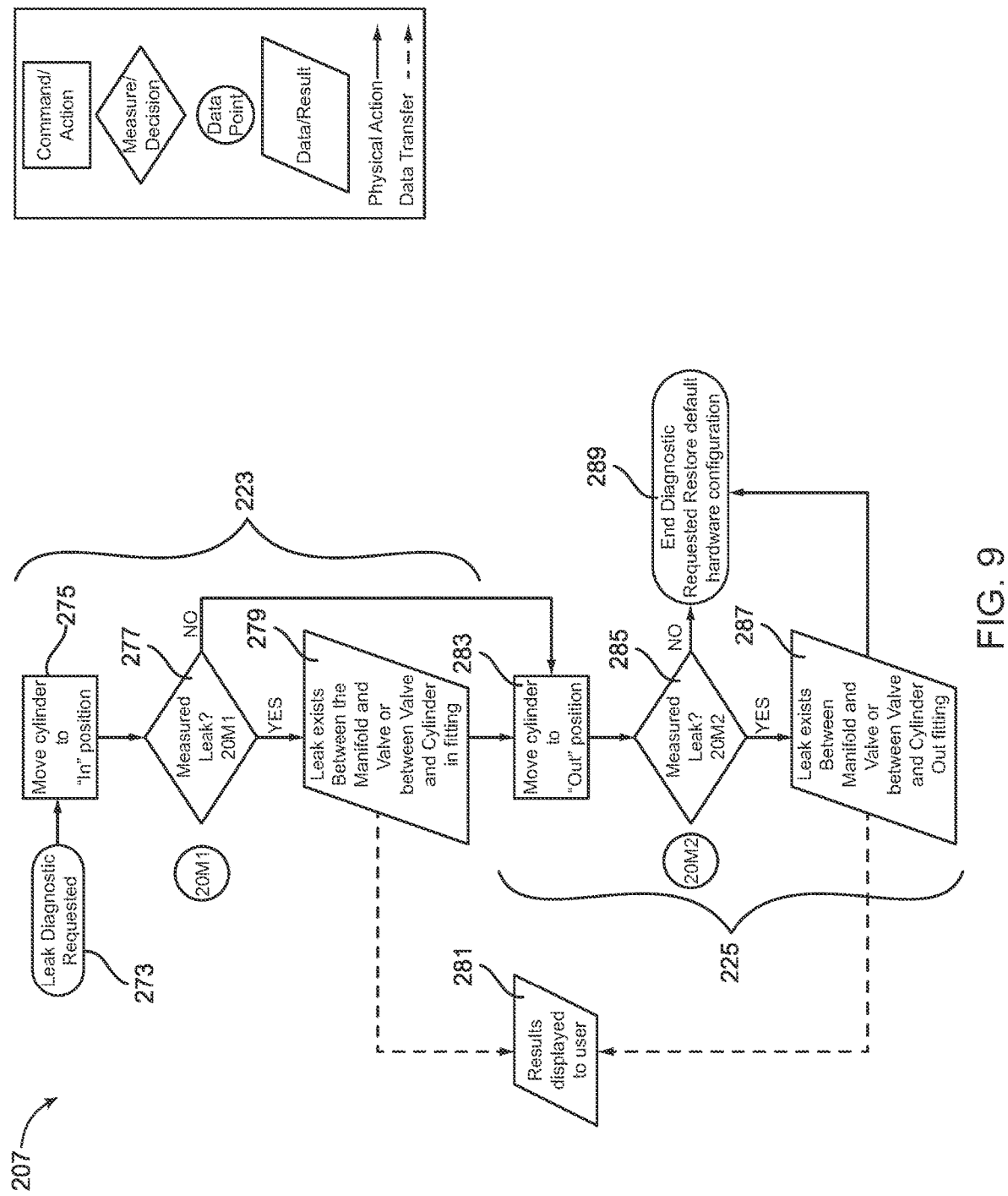
FIG. 9 depicts a flowchart of an exemplary method for checking for a leak in an exemplary second branch of the pneumatic system of FIG. 3.

Green line system check step (207) is depicted in greater detail in FIG. 9. Green line system check step (207) begins with a step (273) whereby a leak diagnostic is requested. Thereafter, step (273) proceeds to a step (275). In step (275), cylinder element (79) is moved to the cylinder in position. Thereafter, step (275) proceeds to a step (277). In step (277), a leak detection method such as method (115) is performed and a determination is made regarding whether a leak exists between manifold (47) and bulk feeder valve (81) or between bulk feeder valve (81) and a cylinder in fitting (not shown) associated with cylinder element (79). If a leak is detected, step (277) proceeds to a step (279) to indicate a leak exists between manifold (47) and bulk feeder valve (81) or between bulk feeder valve (81) and the cylinder out fitting. Thereafter, step (279) optionally proceeds to a step (281) to report the results and simultaneously proceeds to a step (283). Similarly, if no leak is detected, step (277) proceeds to step (283). Steps (275, 277, 279) are generally reflected in step (223) of FIG. 7.

In step (283), cylinder element (79) is moved to the cylinder out position. Thereafter, step (283) proceeds to a step (285). In step (285) a leak detection method such as method (115) is performed and a determination is made regarding whether a leak exists between manifold (47) and bulk feeder valve (81) or between bulk feeder valve (81) and a cylinder out fitting (not shown) associated with cylinder element (79). If a leak is detected, step (285) proceeds to a step (287) to indicate a leak exists between manifold (47) and bulk feeder valve (81) or between bulk feeder valve (81) and the cylinder out fitting. Thereafter, step (287) optionally proceeds to step (281) to report the results and simultaneously proceeds to a step (289) to restore the default hardware configuration for green line (71) and end green blue line system check step (207). Similarly, if no leak is detected, step (285) proceeds to step (289). Steps (283, 285, 287) are generally reflected in step (225) of FIG. 7.

Each leak determination and pressure measurement of green line system check step (207) is performed using green line sensor (75). Thus, a leak may be detected, located, and the pressure decay determined anywhere within green line (71) using a single sensor, namely, green line sensor (75).

C. Yellow Line System Check

Figure 10A:
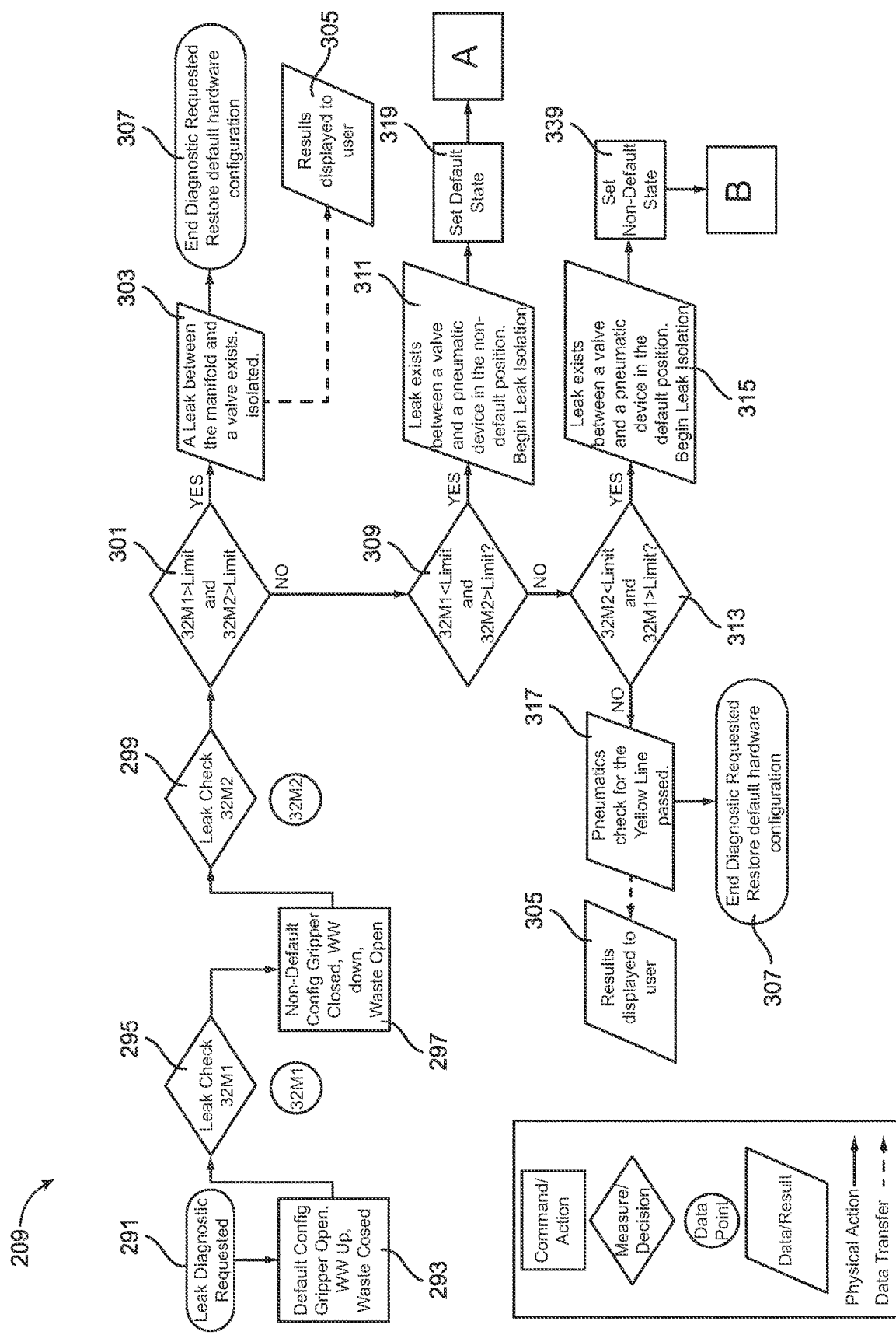
FIG. 10A depicts a portion of a flowchart of an exemplary method for checking for a leak in an exemplary third branch of the pneumatic system of FIG. 3.
Figure 10B:
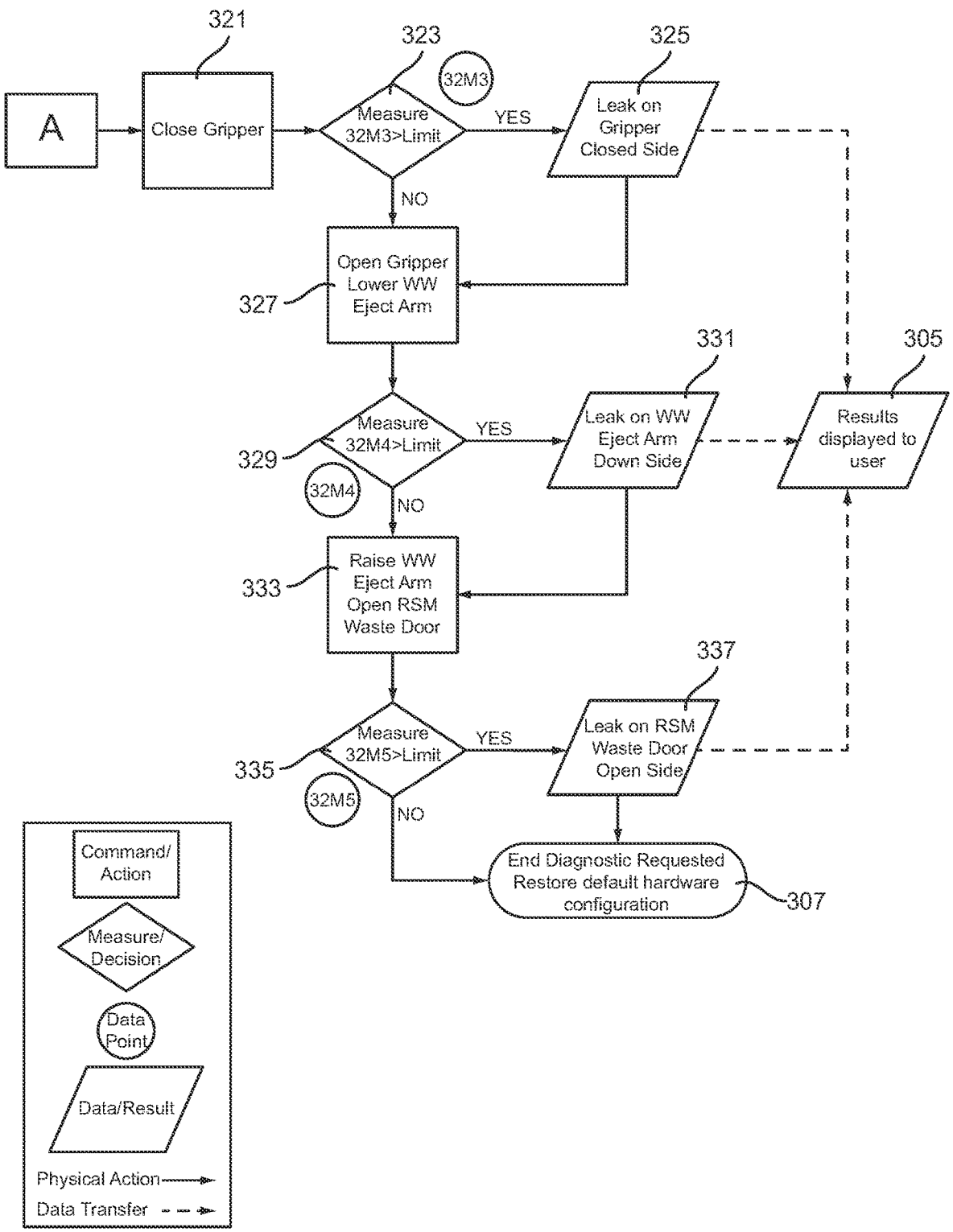
FIG. 10B depicts another portion of the flowchart of the exemplary method for checking for a leak in the exemplary third branch of the pneumatic system of FIG. 3.
Figure 10C:
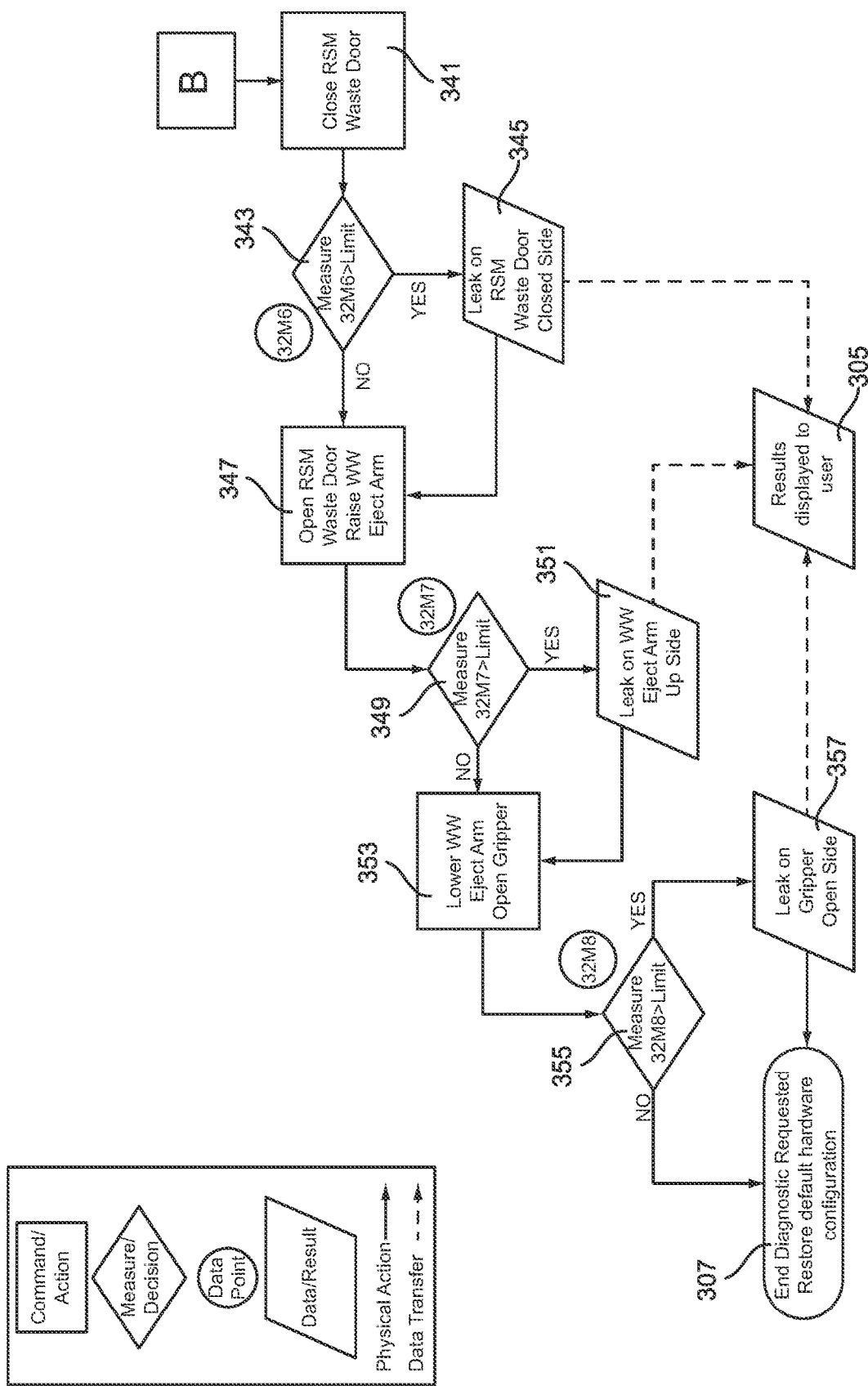
FIG. 10C depicts another portion of the flowchart of the exemplary method for checking for a leak in the exemplary third branch of the pneumatic system of FIG. 3.

Yellow line system check step (209) is depicted in greater detail in FIGS. 10A-10C. Yellow line system check step (209) begins in FIG. 10A with a step (291) whereby a leak diagnostic is requested. Thereafter, step (291) proceeds to a step (293). In step (293), the pneumatic components of yellow line (85) are set to a default position, namely, gripper element (97) is in the open position, door element (99) is in the closed position, and wash wheel arm element (101) is in the up position. This default position of the pneumatic components of yellow line (85) is exemplary. In other versions of yellow line check step (209), other positions of the pneumatic components may be used in the default position. The default position may also be referred to as a first configuration. After the pneumatic components of yellow line (85) are set to the default position, step (293) proceeds to a step (295).

In step (295), a leak detection method such as method (115) is performed and a determination is made regarding whether leakage exists in yellow line (85) in the default position and a leakage measurement (M1) is collected. Thereafter, step (295) proceeds to a step (297). In step (297), the pneumatic components of yellow line (85) are set to a non-default position, namely, gripper element (97) is in the closed position, door element (99) is in the open position, and wash wheel arm element (101) is in the down position. This non-default position of the pneumatic components of yellow line (85) is exemplary. In other versions of yellow line check step (209), other positions of pneumatic components may be used in the non-default position. The non-default position may also be referred to as a second configuration. After the pneumatic components of yellow line (85) are set to the non-default position, step (297) proceeds to a step (299).

In step (299), a leak detection method such as method (115) is performed and a determination is made regarding whether leakage exists in yellow line (85) in the non-default position and a leakage measurement (M2) is collected. Thereafter, step (295) proceeds to a step (301).

In step (301), leakage measurement (M1) is compared to a first configuration threshold value and leakage measurement (M2) is compared to a second configuration threshold value. If step (301) determines leakage measurement (M1) is greater than the first configuration threshold value and leakage measurement (M2) is greater than the second configuration threshold value, step (301) proceeds to a step (303). Step (303) indicates a leak exists between manifold (47) and one of the valves in yellow line (85), namely, gripper valve (103), door valve (105), and/or wheel valve (107). Thereafter, step (303) optionally proceeds to a step (305) to report/display the results and simultaneously proceeds to a step (307) to restore the default hardware configuration for yellow line (85) and end yellow line system check step (209).

If step (301) determines leakage measurement (M1) is not greater than the first configuration threshold valve or leakage measurement (M2) is not greater than the second configuration threshold valve, step (301) proceeds to a step (309). In step (309), leakage measurement (M1) is compared to the first configuration threshold value and leakage measurement (M2) is compared to the second configuration threshold value. If step (309) determines leakage measurement (M1) is not greater than the first configuration threshold value and leakage measurement (M2) is greater than the second configuration threshold value, step (309) proceeds to a step (311). Step (311) indicates a leak exists between one of the valves in yellow line (85), namely, gripper valve (103), door valve (105), and/or wheel valve (107) and one of the pneumatic components in the non-default configuration, namely, gripper element (97), door element (99), and/or wash wheel arm element (101).

If step (309) determines leakage measurement (M1) is greater than the first configuration threshold valve or leakage measurement (M2) is not greater than the second configuration threshold valve, step (309) proceeds to a step (313). In step (313), leakage measurement (M1) is compared to the first configuration threshold value and leakage measurement (M2) is compared to the second configuration threshold value. If step (313) determines leakage measurement (M1) is greater than the first configuration threshold value and leakage measurement (M2) is not greater than the second configuration threshold value, step (313) proceeds to a step (315). Step (315) indicates a leak exists between one of the valves in yellow line (85), namely, gripper valve (103), door valve (105), and/or wheel valve (107) and one of the pneumatic devices in the default configuration, namely, gripper element (97), door element (99), and/or wash wheel arm element (101).

If step (313) determines leakage measurement (M1) is not greater than the first configuration threshold value or leakage measurement (M2) is greater than the second configuration threshold value, step (313) proceeds to a step (317). Step (317) indicates the pneumatic check for yellow line (85) passed and no leakage is detected in yellow line (85). Thereafter, step (317) optionally proceeds to step (305) to report/display the results and simultaneously proceeds to step (307) to restore the default hardware configuration for yellow line (85) and end yellow line system check step (209).

Step (311) proceeds to a step (319), whereby the pneumatic components of yellow line (85) are set to the default position, namely, gripper element (97) is in the open position, door element (99) is in the closed position, and wash wheel arm element (101) is in the up position. Thereafter, step (319) proceeds to a step (321) of FIG. 10B, whereby gripper element (97) is moved to the closed position. Thereafter, step (321) proceeds to a step (323). In step (323), a leak detection method such as method (115) is performed and a determination is made regarding whether leakage exists in yellow line (85) in the current configuration and a leakage measurement (M3) is collected. Leakage measurement (M3) is compared to a third configuration threshold value. If leakage measurement (M3) is greater than the third configuration threshold value, step (323) proceeds to a step (325). Step (325) indicates a leak exists on the closed side of gripper element (97). Step (325) optionally proceeds to step (305) to report/display the results and simultaneously proceeds to a step (327). If leakage measurement (M3) is not greater than the third configuration threshold value, step (323) proceeds to step (327).

In step (327), gripper element (97) is moved to the open position and wash wheel arm element (101) is moved to the down position. Thereafter, step (327) proceeds to a step (329). In step (329), a leak detection method such as method (115) is performed and a determination is made regarding whether leakage exists in yellow line (85) in the current configuration and a leakage measurement (M4) is collected. Leakage measurement (M4) is compared to a fourth configuration threshold value. If leakage measurement (M4) is greater than the fourth configuration threshold value, step (329) proceeds to a step (331). Step (331) indicates a leak exists on the down side of wash wheel arm element (101). Step (331) optionally proceeds to step (305) to report/display the results and simultaneously proceeds to a step (333). If leakage measurement (M4) is not greater than the fourth configuration threshold value, step (327) proceeds to step (333).

In step (333), wash wheel arm element (101) is moved to the up position and door element (99) is moved to the open position. Thereafter, step (333) proceeds to a step (335). In step (335), a leak detection method such as method (115) is performed and a determination is made regarding whether leakage exists in yellow line (85) in the current configuration and a leakage measurement (M5) is collected. Leakage measurement (M5) is compared to a fifth configuration threshold value. If leakage measurement (M5) is greater than the fifth configuration threshold value, step (335) proceeds to a step (337). Step (337) indicates a leak exists on the open side of door element (99). Step (337) optionally proceeds to step (305) to report/display the results and simultaneously proceeds to step (307). If leakage measurement (M5) is not greater than the fifth configuration threshold value, step (335) proceeds to step (307).

Step (315) proceeds to a step (339), whereby the pneumatic components of yellow line (85) are set to the non-default position, namely, gripper element (97) is in the closed position, door element (99) is in the open position, and wash wheel arm element (101) is in the down position. Thereafter, step (339) proceeds to a step (341) of FIG. 10C, whereby door element (99) is moved to the closed position. Thereafter, step (341) proceeds to a step (343).

In step (343), a leak detection method such as method (115) is performed and a determination is made regarding whether leakage exists in yellow line (85) in the current configuration and a leakage measurement (M6) is collected. Leakage measurement (M6) is compared to a sixth configuration threshold value. If leakage measurement (M6) is greater than the sixth configuration threshold value, step (343) proceeds to a step (345). Step (345) indicates a leak exists on the closed side of door element (99). Step (345) optionally proceeds to step (305) to report/display the results and simultaneously proceeds to step (347). If leakage measurement (M6) is not greater than the sixth configuration threshold value, step (343) proceeds to step (347).

In step (347), door element (99) is moved to the open position and wash wheel arm element (101) is moved to the up position. Thereafter, step (347) proceeds to a step (349). In step (349), a leak detection method such as method (115) is performed and a determination is made regarding whether leakage exists in yellow line (85) in the current configuration and a leakage measurement (M7) is collected. Leakage measurement (M7) is compared to a seventh configuration threshold value. If leakage measurement (M7) is greater than the seventh configuration threshold value, step (349) proceeds to a step (351). Step (351) indicates a leak exists on the up side of wash wheel arm element (101). Step (351) optionally proceeds to step (305) to report/display the results and simultaneously proceeds to step (353). If leakage measurement (M7) is not greater than the seventh configuration threshold value, step (349) proceeds to step (353).

In step (353), wash wheel arm element (101) is moved to the down position and gripper element (97) is moved to the open position. Thereafter, step (353) proceeds to a step (355). In step (355), a leak detection method such as method (115) is performed and a determination is made regarding whether leakage exists in yellow line (85) in the current configuration and a leakage measurement (M8) is collected. Leakage measurement (M8) is compared to an eighth configuration threshold value. If leakage measurement (M8) is greater than the eighth configuration threshold value, step (355) proceeds to a step (357). Step (357) indicates a leak exists on the open side of gripper element (97). Step (357) optionally proceeds to step (305) to report/display the results and simultaneously proceeds to step (307). If leakage measurement (M8) is not greater than the eighth configuration threshold value, step (355) proceeds to step (307).

Each leak determination and pressure measurement of yellow line system check step (209) is performed using yellow line sensor (89). Thus, a leak may be detected, located, and the pressure decay determined anywhere within yellow line (85) using a single sensor, namely, yellow line sensor (89).

D. Other Pneumatic System Diagnostic System Methods

Figure 11:
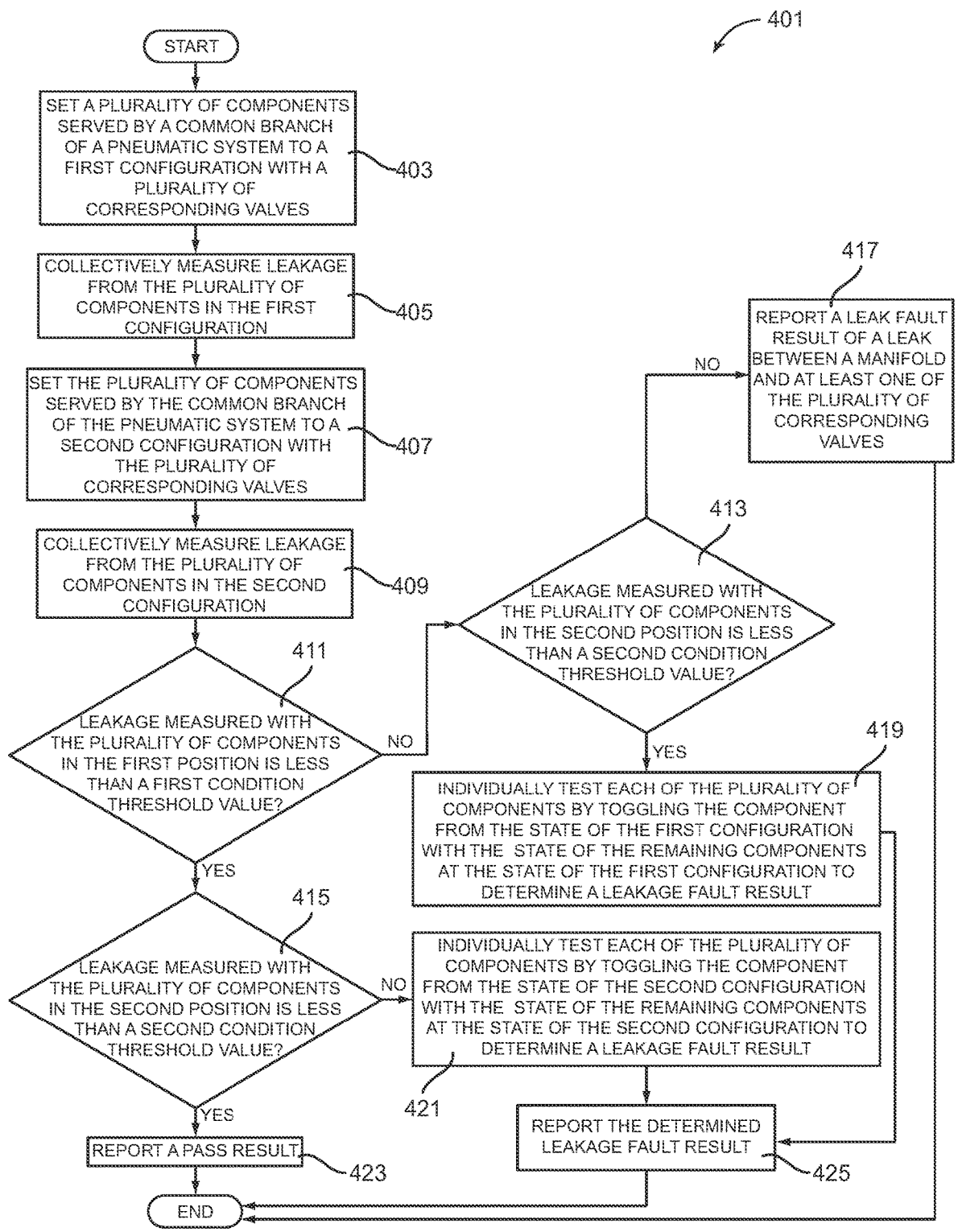
FIG. 11 depicts a flowchart of another exemplary method for checking for a leak in the pneumatic system of FIG. 3.

Another exemplary pneumatic system diagnostic system method is depicted in FIG. 11 as method (401). Method (401) begins with a step (403). Step (403) sets a plurality of components served by a common branch of a pneumatic system to a first configuration with a plurality of corresponding valves. Thereafter, step (403) proceeds to a step (405). Step (405) collectively measures leakage from the plurality of components in the first configuration. Thereafter, step (405) proceeds to a step (407).

Step (407) sets the plurality of components served by the common branch of the pneumatic system to a second configuration with the plurality of corresponding valves. Thereafter, step (407) proceeds to a step (409). Step (409) collectively measures leakage from the plurality of components in the second configuration. Thereafter, step (409) proceeds to a step (411).

Step (411) determines whether leakage measured with the plurality of components in the first position is less than a first condition threshold value and proceeds to a step (413) if not. If so, step (411) proceeds to a step (415). Step (413) determines whether leakage measured with the plurality of components in the second position is less than a second condition threshold value and proceeds to a step (417) if not. If so, step (413) proceeds to a step (419). Step (417) reports a leak fault result of a leak between a manifold and at least one of the plurality of corresponding valves. Thereafter, step (417) proceeds to a step (425). Step (425) reports the determined leakage fault result. Thereafter, method (401) proceeds to end.

Step (419) individually tests each of the plurality of components by toggling the component from the state of the first configuration with the state of the remaining components at the state of the first configuration to determine a leakage fault result. Step (419) thereafter proceeds to step (425).

Step (415) determines whether leakage measured with the plurality of components in the second position is less than a second condition threshold value and proceeds to a step (421) if not. If so, step (415) proceeds to a step (423). Step (423) reports a pass result and thereafter method (401) proceeds to end.

Step (421) individually tests each of the plurality of components by toggling the component from the state of the second configuration with the state of the remaining components at the state of the second configuration to determine a leakage fault result. Thereafter, step (421) proceeds to step (425).

Figure 12:
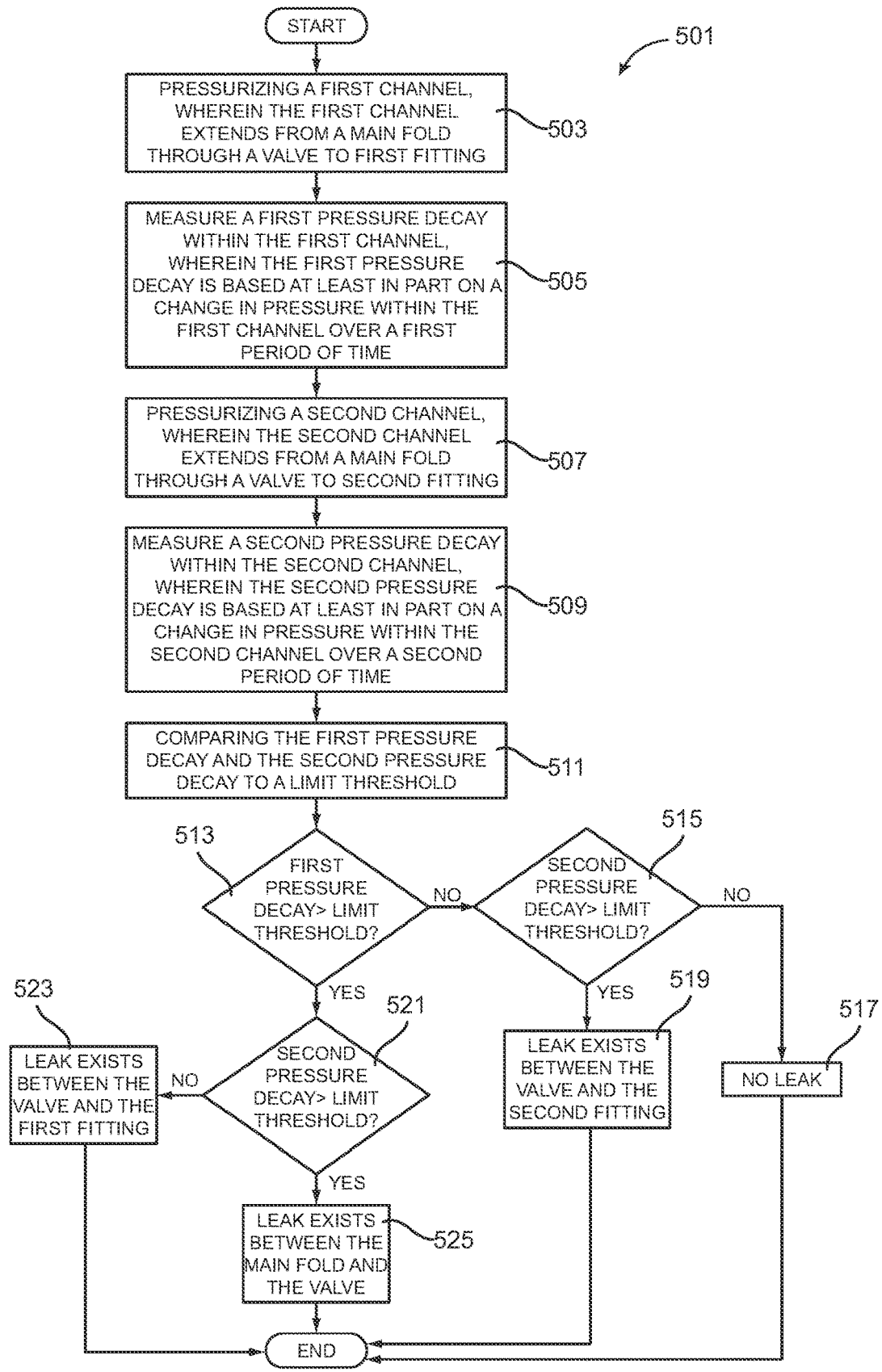
FIG. 12 depicts a flowchart of another exemplary method for checking for a leak in the pneumatic system of FIG. 3.

Another exemplary pneumatic system diagnostic system method is depicted in FIG. 12 as method (501). Method (501) begins with a step (503). In step (503), a first channel is pressurized, wherein the first channel extends from a manifold through a valve to a first fitting. Thereafter, step (503) proceeds to a step (505). In step (505), a first pressure decay within the first channel is measured, wherein the first pressure decay is based at least in part on a change in pressure within the first channel over a first period of time. Thereafter, step (505) proceeds to a step (507). In step (507), a second channel is pressurized, wherein the second channel extends from the manifold through the valve to a second fitting. Thereafter, step (507) proceeds to a step (509). In step (509), a second pressure decay with in the second channel is measured, wherein the second pressure decay is based at least in part on a change in pressure within the second channel over a second period of time. Thereafter, step (509) proceeds to a step (511). In step (511), the first pressure decay and the second pressure decay is compared to a limit threshold. Thereafter, step (511) proceeds to a step (513).

In step (513), a determination is made regarding whether the first pressure decay is greater than the limit threshold and if not, step (513) proceeds to a step (515). If so, step (513) proceeds to a step (521). In step (515), a determination is made regarding whether the second pressure decay is greater than the threshold limit and if not, step (515) proceeds to a step (517). If so, step (515) proceeds to a step (519). In step (517), method (501) has determined that no leak is detected, and method (501) proceeds to end. In step (519), method (501) has determined a leak exists between the valve and the second fitting, and method (501) proceeds to end.

In step (521), a determination is made regarding whether the second pressure decay is greater than the limit threshold and if not, step (521) proceeds to a step (523). If so, step (521) proceeds to a step (525). In step (525), method (501) has determined a leak exits between the manifold and the valve, and method (501) proceeds to end. In step (523), method (501) has determined that a leak exists between the valve and the first fitting, and method (501) proceeds to end.

IV. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A method of diagnosing a leakage fault in a pneumatic system, the method comprising: setting a plurality of components served by a common branch of the pneumatic system to a first configuration with a plurality of corresponding valves; collectively measuring leakage from the plurality of components in the first configuration; setting the plurality of components served by the common branch of the pneumatic system to a second configuration with the plurality of corresponding valves; collectively measuring leakage from the plurality of components in the second configuration; and if the leakage measured with the plurality of components at the first configuration is less than a first configuration threshold value and the leakage measured with the plurality of components at the second configuration is less than a second configuration threshold value, then reporting a pass result.

Example 2

The method of Example 1 or any of the subsequent Examples wherein at least one of the plurality of components is a pneumatic actuator of a laboratory instrument and wherein the pneumatic system is adapted to selectively actuate the at least one actuator.

Example 3

The method of any of the previous or subsequent Examples, wherein the leakage fault includes at least one leak above at least one corresponding threshold value.

Example 4

The method of any of the previous or subsequent Examples, wherein the at least one corresponding threshold value is substantially zero.

Example 5
The method of any of the previous or subsequent Examples, wherein the at least one corresponding threshold value is substantially higher than one or more worst case leak from one or more valve, manifold, and/or actuator and substantially lower than one or more worst case leak from one or more flexible line.

Example 6

The method of any of the previous or subsequent Examples, wherein collectively measuring leakage is accomplished by a number of pressure sensors in communication with the common branch that is less than a number of components served by the common branch.

Example 7

The method of any of the previous or subsequent Examples, wherein collectively measuring leakage is accomplished by a single pressure sensor in communication with the common branch.

Example 8

The method of any of the previous or subsequent Examples, wherein at least one valve of the plurality of corresponding valves allows pneumatic flow through the at least one valve from a supply side of the valve to a component side of the valve in all configurations of the at least one valve.

Example 9

The method of any of the previous or subsequent Examples, wherein all of the valves of the plurality of corresponding valves always allow pneumatic flow through each of the valves from the supply side of the valve to the component side of the valve in all of the configurations of the valve.

Example 10

The method of any of the previous or subsequent Examples, wherein at least one valve of the plurality of corresponding valves includes a single port on a component side of the valve and allows pneumatic flow through the at least one valve from a supply side of the valve to a component side of the valve in all configurations of the at least one valve.

Example 11

The method of any of the previous or subsequent Examples, wherein all of the valves of the plurality of corresponding valves include the single port on the component side of the valve and always allow pneumatic flow through each of the valves from the supply side of the valve to the component side of the valve in all of the configurations of the valve.

Example 12

The method of any of the previous or subsequent Examples, wherein at least one valve of the plurality of corresponding valves includes dual ports on a component side of the valve and allows pneumatic flow through the at least one valve from a supply side of the valve to a component side of the valve in all configurations of the at least one valve.

Example 13

The method of any of the previous or subsequent Examples, wherein all of the valves of the plurality of corresponding valves include the dual ports on the component side of the valve and always allow pneumatic flow through each of the valves from the supply side of the valve to the component side of the valve in all of the configurations of the valve.

Example 14

The method of any of the previous or subsequent Examples, wherein the first configuration is a default configuration and the second configuration is a non-default configuration.

Example 15

The method of any of the previous or subsequent Examples, wherein each of the plurality of components is a binary component with two states, wherein each of the plurality of corresponding valves is a binary valve with two corresponding states, and wherein the states of each of the binary valves are opposite between the first configuration and the second configuration.

Example 16

The method of any of the previous or subsequent Examples, further comprising if the leakage measured with the plurality of components at the first configuration is less than the first configuration threshold value and the leakage measured with the plurality of components at the second configuration is greater than the second configuration threshold value, then individually test each of the plurality of components by toggling the component from the state of the second configuration with the state of the remaining components at the state of the second configuration and report a leakage fault result that is determined.

Example 17

The method of any of the previous or subsequent Examples, further comprising if the leakage measured with the plurality of components at the first configuration is greater than the first configuration threshold value and the leakage measured with the plurality of components at the second configuration is less than the second configuration threshold value, then individually test each of the plurality of components by toggling the component from the state of the first configuration with the state of the remaining components at the state of the first configuration and report a leakage fault result that is determined.

Example 18

The method of any of the previous or subsequent Examples, further comprising if the leakage measured with the plurality of components at the first configuration is greater than the first configuration threshold value and the leakage measured with the plurality of components at the second configuration is greater than the second configuration threshold value, then report a leakage fault result of a leak between a manifold and at least one of the plurality of corresponding valves.

Example 19

The method of any of the previous or subsequent Examples, further comprising repeatedly testing the pneumatic system to detect the leakage fault as the leakage fault occurs and before additional leakage faults can occur.

Example 20

A method of diagnosing a leak in a pneumatic system of a laboratory instrument, the method comprising: (a) pressurizing a first channel, wherein the first channel extends from a manifold through a valve to a first fitting; (b) measuring a first pressure decay within the first channel, wherein the first pressure decay is based at least in part on a change in pressure within the first channel over a first period of time; (c) pressurizing a second channel, wherein the second channel extends from the manifold through the valve to a second fitting; (d) measuring a second pressure decay within the second channel, wherein the second pressure decay is based at least in part on a change in pressure within the second channel over a second period of time; (e) comparing the first pressure decay and the second pressure decay to a limit threshold; (f) in response to determining the first pressure decay and the second pressure decay are greater than the limit threshold, determining the leak exists between the manifold and the valve; (g) in response to determining the first pressure decay is greater than the limit threshold and the second pressure decay is less than the limit threshold, determining the leak exists between the valve and the first fitting; and (h) in response to determining the first pressure decay is less than the limit threshold and the second pressure decay is greater than the limit threshold, determining the leak exists between the valve and the second fitting.

Example 21

The method of any of the previous or subsequent Examples, wherein the valve comprises a three-way valve.

Example 22

The method of any of the previous or subsequent Examples, further comprising disposing a cylinder between the first fitting and the second fitting.

Example 23

The method of any of the previous or subsequent Examples, further comprising: (a) in response to pressurizing the first channel, actuating the cylinder to a first position; and (b) in response to pressurizing the second channel, actuating the cylinder to a second position.

Example 24

The method of any of the previous or subsequent Examples, further comprising storing the first pressure decay and the second pressure decay in a computer memory of the laboratory instrument.

Example 25

The method of any of the previous or subsequent Examples, further comprising storing the first pressure decay and the second pressure decay in a memory of a computer system, wherein the computer system is remote from the laboratory instrument.

Example 26

The method of any of the previous or subsequent Examples, wherein the method of diagnosing the leak is initiated automatically at periodic intervals.

Example 27

The method of any of the previous or subsequent Examples, wherein measuring the first pressure decay comprises: (a) measuring a first pressure within the first channel; (b) waiting the first period of time; (c) measuring a second pressure within the first channel; and (d) calculating the first pressure decay as the difference between the first pressure and the second pressure.

Example 28

The method of any of the previous or subsequent Examples, wherein measuring the second pressure decay comprises: (a) measuring a third pressure within the second channel; (b) waiting the second period of time; (c) measuring a fourth pressure within the second channel; and (d) calculating the second pressure decay as the difference between the third pressure and the fourth pressure.

Example 29

The method of any of the previous or subsequent Examples, further comprising generating an alert in response to determining the leak exists between the manifold and the valve.

Example 30

A method of detecting and locating a leak in a pneumatic system comprising: (a) pneumatically associating a sensor with a branch of the pneumatic system, wherein the branch includes at least two three-way four-port valves, wherein each valve is pneumatically associated with a pneumatic component, wherein each pneumatic component is pneumatically actuatable to transition between a first state and a second state; (b) iteratively pneumatically actuating each pneumatic component in the branch to pressurize a plurality of channels within the branch; (c) in response to pressurizing a channel in the plurality of channels, measuring the pressure in the channel with the sensor over a period to determine a pressure decay; and (d) determining a location of a leak within the branch, wherein the determination is based at least in part on the measured pressure decays.

V. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A method of diagnosing a leakage fault in a pneumatic system, the method comprising:
    (a) setting a plurality of components served by a common branch of the pneumatic system to a first configuration with a plurality of corresponding valves;
    (b) collectively measuring leakage from the plurality of components in the first configuration;
    (c) setting the plurality of components served by the common branch of the pneumatic system to a second configuration with the plurality of corresponding valves wherein each of the plurality of components is a binary component with two states, wherein each of the plurality of corresponding valves is a binary valve with two corresponding states, and wherein the states of each of the binary valves are opposite between the first configuration and the second configuration;
    (d) collectively measuring leakage from the plurality of components in the second configuration;
    (e) if the leakage measured with the plurality of components at the first configuration is less than a first configuration threshold value and the leakage measured with the plurality of components at the second configuration is less than a second configuration threshold value, then reporting a pass result; and
    (f) if the leakage measured with the plurality of components at the first configuration is less than the first configuration threshold value and the leakage measured with the plurality of components at the second configuration is greater than the second configuration threshold value, then individually testing each of the plurality of components by toggling the component from the state of the second configuration with the state of the remaining components at the state of the second configuration and report a leakage fault result that is determined.

2. The method of claim 1, wherein:
    (a) at least one of the plurality of components is a pneumatic actuator of a laboratory instrument and wherein the pneumatic system is adapted to selectively actuate the at least one actuator;
    (b) the leakage fault includes at least one leak above at least one corresponding threshold value;
    (c) the at least one corresponding threshold value is substantially zero; and
    (d) the at least one corresponding threshold value is substantially higher than a leak from one or more valve, manifold, and/or actuator and substantially lower than a leak from one or more flexible line.

3. The method of claim 2, wherein collectively measuring leakage is accomplished by a number of pressure sensors in communication with the common branch that is less than a number of components served by the common branch.

4. The method of claim 3, wherein at least one valve of the plurality of corresponding valves allows pneumatic flow through the at least one valve from a supply side of the valve to a component side of the valve in all configurations of the at least one valve.

5. The method of claim 3, wherein at least one valve of the plurality of corresponding valves includes a single port on a component side of the valve and allows pneumatic flow through the at least one valve from a supply side of the valve to a component side of the valve in all configurations of the at least one valve.

6. The method of claim 3, wherein at least one valve of the plurality of corresponding valves includes dual ports on a component side of the valve and allows pneumatic flow through the at least one valve from a supply side of the valve to a component side of the valve in all configurations of the at least one valve.

7. The method of claim 6, wherein the first configuration is a default configuration and the second configuration is a non-default configuration.

8. The method of claim 7, further comprising if the leakage measured with the plurality of components at the first configuration is greater than the first configuration threshold value and the leakage measured with the plurality of components at the second configuration is less than the second configuration threshold value, then individually test each of the plurality of components by toggling the component from the state of the first configuration with the state of the remaining components at the state of the first configuration and report a leakage fault result that is determined.

9. The method of claim 8, further comprising if the leakage measured with the plurality of components at the first configuration is greater than the first configuration threshold value and the leakage measured with the plurality of components at the second configuration is greater than the second configuration threshold value, then report a leakage fault result of a leak between a manifold and at least one of the plurality of corresponding valves.

10. The method of claim 9, further comprising repeatedly testing the pneumatic system to detect the leakage fault as the leakage fault occurs and before additional leakage faults can occur.

11. The method of claim 3, wherein collectively measuring leakage is accomplished by a single pressure sensor in communication with the common branch.

12. The method of claim 4, wherein all of the valves of the plurality of corresponding valves always allow pneumatic flow through each of the valves from the supply side of the valve to the component side of the valve in all of the configurations of the valve.

13. The method of claim 5, wherein all of the valves of the plurality of corresponding valves include the single port on the component side of the valve and always allow pneumatic flow through each of the valves from the supply side of the valve to the component side of the valve in all of the configurations of the valve.

14. The method of claim 6, wherein all of the valves of the plurality of corresponding valves include the dual ports on the component side of the valve and always allow pneumatic flow through each of the valves from the supply side of the valve to the component side of the valve in all of the configurations of the valve.

* * * * *